`US005920694A`

United States Patent [19]
Carleton et al.

[11] Patent Number: 5,920,694
[45] Date of Patent: Jul. 6, 1999

[54] ANNOTATION OF COMPUTER VIDEO DISPLAYS

[75] Inventors: Allison A. Carleton, Lisle; David R. Connet; Krista S. Schwartz, both of Batavia, all of Ill.

[73] Assignee: NCR Corporation, Dayton, Ohio

[21] Appl. No.: 08/833,549

[22] Filed: Apr. 7, 1997

Related U.S. Application Data

[63] Continuation of application No. 08/128,013, Sep. 28, 1993, abandoned, which is a continuation-in-part of application No. 08/035,092, Mar. 19, 1993.
[51] Int. Cl.[6] ............................ G06F 13/38; G06F 15/17
[52] U.S. Cl. .................................... 395/200.35; 345/331
[58] Field of Search ....................... 395/200.34, 200.35; 707/512; 345/509, 510, 330, 331

[56] References Cited

U.S. PATENT DOCUMENTS

| | | | |
|---|---|---|---|
| 4,616,336 | 10/1986 | Robertson et al. | 395/154 |
| 5,181,255 | 1/1993 | Bloomberg | 382/9 |
| 5,241,625 | 8/1993 | Epard et al. | 395/163 |
| 5,250,929 | 10/1993 | Hoffman et al. | 345/146 |
| 5,264,837 | 11/1993 | Buehler | 315/115 |
| 5,309,555 | 5/1994 | Akins et al. | 395/157 |
| 5,375,068 | 12/1994 | Palmer et al. | 364/514 |
| 5,442,744 | 8/1995 | Piech et al. | 395/154 |
| 5,448,519 | 9/1995 | Kimura et al. | 361/189.01 |
| 5,502,727 | 3/1996 | Catanzaro et al. | 370/94.2 |
| 5,537,548 | 7/1996 | Fin et al. | 398/200.4 |
| 5,625,833 | 4/1997 | Levine et al. | 395/800 |

FOREIGN PATENT DOCUMENTS

410378 A2   1/1991   European Pat. Off. .

OTHER PUBLICATIONS

"AT+T Brings Visual Communications/Computing to the Desktop" Mar. 29, 1996.

Compression Labs, Inc. (CLI), Special Report, Aug. 20, 1993, pp. 66–69.

Preliminary Information from ShareVision Technology Inc., 1992, PPIN0992 Rev. B, Hoshi, Nakamura, Nakamura, "Broadband ISDN Multimedia Workstations and Group TeleWorking Systems", *Hitachi Review* vol. 40 (1991), No. 3, pp. 217–222.

Watabe, Sakata, Maeno, Fukuoka and Ohmori, "Multimedia Desktop Conferencing System: MERMAID", *NEC Research and Development* vol. 32, No. 1 pp. 158–167, Jan. 1991.

Werner B. Korte, "Multimedia BK Technology for the Support of Distributed Group Work", *Widebank Communication*, pp. 872–878, 1990.

Telegraphics Design Document Draft May 22, 1992.

Moskowitz, Robert, "The Electronic Meeting" *Presentation Products Magazine*, Sep., 1990, pp. 24–32.

Piturro, Marlene C., "Computer Conferencing: Brainstorming Across Time and Space", *Management Review*, Aug., 1969, pp. 43–50.

(List continued on next page.)

*Primary Examiner*—Mark H. Rinehart
*Attorney, Agent, or Firm*—Gregory A. Welte; George H. Gates

[57] ABSTRACT

A system in which multiple computers engage in a collaborative video conference. One computer generates a common image which is distributed to the other computers. The invention allows the users of the other computers to annotate (that is, mark up, by drawings and text) the image at their respective computers. The invention replicates the annotations at the other computers.

One type of annotation allowed is "highlighting," wherein a user drags a cursor across a display, and the invention leaves a colored trail behind the cursor, which is transparent, and does not obscure the underlying images.

27 Claims, 23 Drawing Sheets

Microfiche Appendix Included
(1 Microfiche, 65 Pages)

OTHER PUBLICATIONS

"IBM Person to Person" Brochure, UltiMedia, IBM United States, Oct., 1991.

DeskTop Conferencing Novell® Local Area Networks Product Description, Fujitsu Networks Industry Inc. Feb. 1993.

Street, April, "Videoconferencing On Any Wire", *MacWeek*, Oct. 5, 1993.

Bartino, Jim, "At These Shouting matches, No One Says a Word" *Business Week*, Jun. 11,1990.

Andrews, Edmund L., "Plugging the Gap Between E–Mail and Video Conferencing" *New Yrok TIme*, Sunday, Jun. 23, 1991, page 9.

Palme, Jacob, "Distributed Computer Conferencing", Elsevier Science Publishers B.V. (North–Holland), pp. 137–145, 1987.

Kelly, John N., "Technology That Supports Meetings" *Patricia Seybold's Office Computing Report*, Sep., 1988.

Wynne, Bye, "Group Support Systems and Electronic Collaboration", American Management Association *Information Management Forum*, May, 1991.

Wynne, Bye, "Groupware and Your Future", American Management Association *Information Management Forum*, Nov., 1989.

"Texaco Contributes to Group Decision Support Services Project", Campus News, *MMR*, Summer, 1990, page 23.

Southworth, Mason,, "How to Have an 'Electronic 'Brainstorm", No. 1, 1990, pp. 12 and 13.

Richman, Louis S., "Software Catches The Team Spirit", Reprinted through the courtesy of the Editors of Fortune.

LaPlante, Alice, "Workgroup Idea Still Unclear to Users", *Info World*, Dec. 11, 1989, vol. 11, Issue 5.

Ententé, Tuenkey Electronic Classroom, 1991.

"The Year 2000: Expect Meetings to Change, Not Decline", *The 3M Meeting Management News*, vol. 3, No. 1, Apr. 1991.

LaPlant, Alice, "IBM Study: PCs Aid in Decision Process", *Info World*, Vol. 11, Issue 49, Before 1990.

"Brainstorming by Modem", *The New York Times*, Sunday, Mar. 24, 1991.

"Study Focuses on Use of Rules in Meetings", *The 3M Meeting Management Institute*, Vol. 3, No. 3, Dec., 1991.

Johansen, Robert "Teams for Tomorrow", Institute for the Future, pp. 521–534, 1991.

Rodden, Tom, "A Survey of CSCW Systems", *Interacting with Computers*, vol. 3, No. 3 (1991) pp. 319–353.

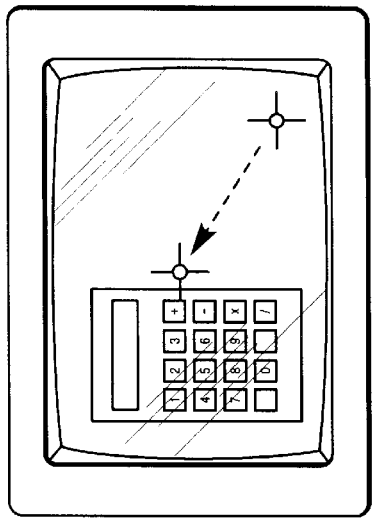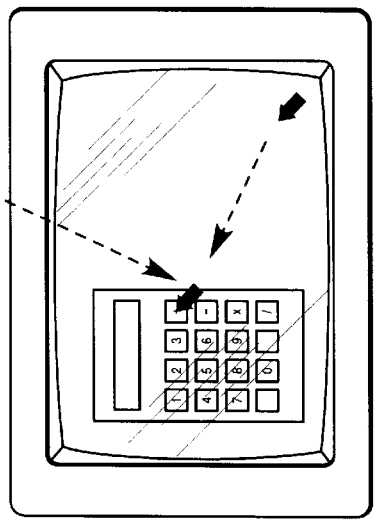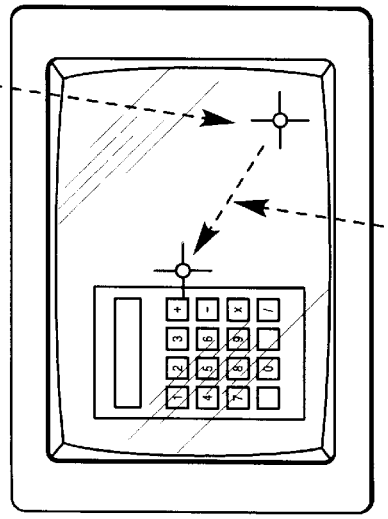
FIG. 3

FIG. 4
MODE: ANNOTATION
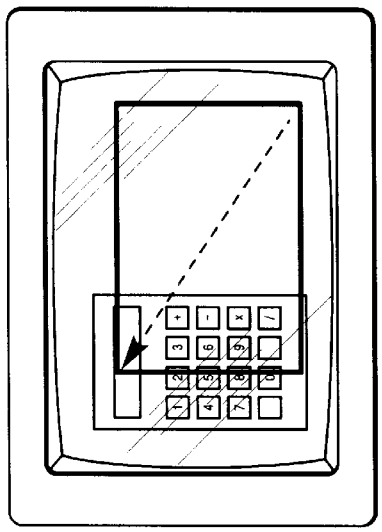
REMOTE
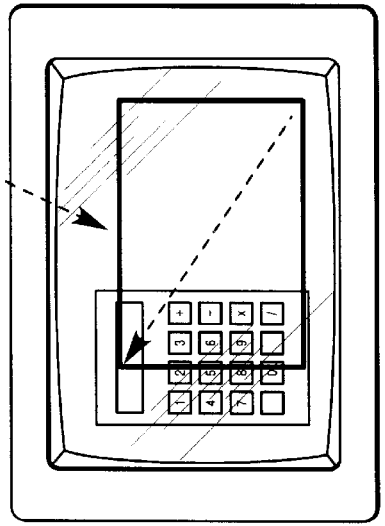
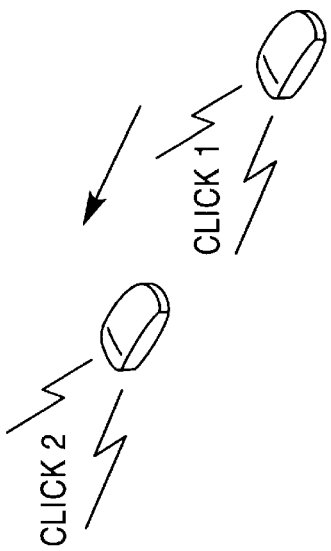
DRAWS BOX
CLICK 1
CLICK 2
HOST
PROGRAM IS RUNNING HERE
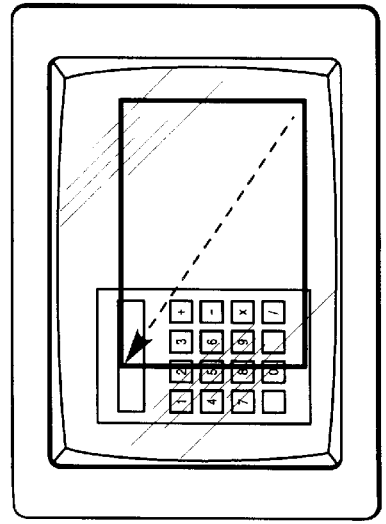
REMOTE

FIG. 6
MODE: LOCAL ANNOTATION
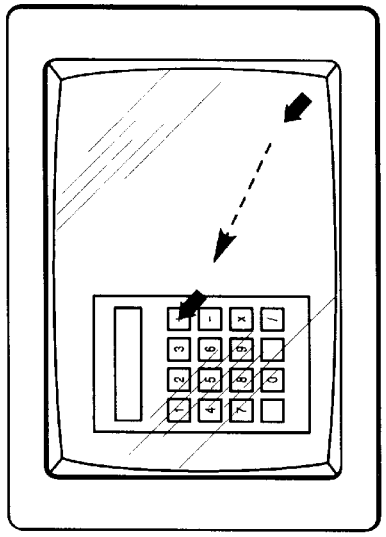
REMOTE
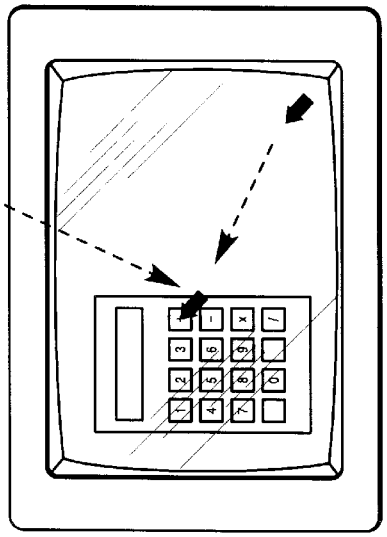
MOUSE CLICK IS IGNORED
CLICK
HOST
PROGRAM IS RUNNING HERE
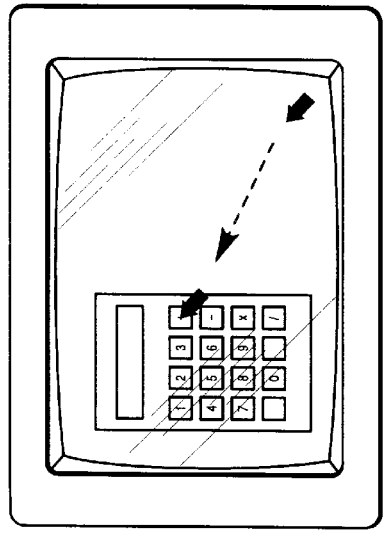
REMOTE

FIG. 8
MODE: VIEW
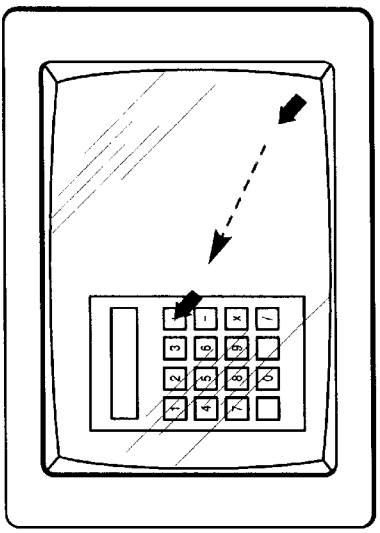
REMOTE
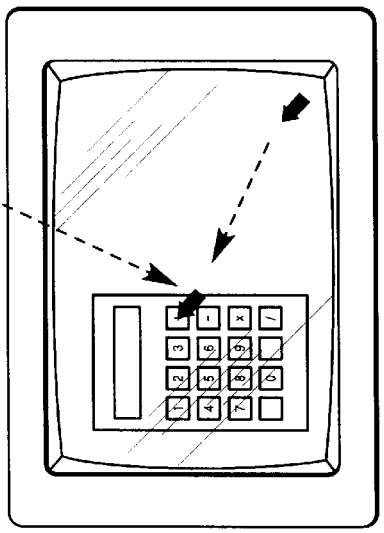
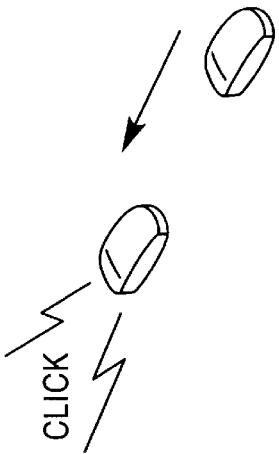
MOUSE CLICK IS IGNORED
CLICK
HOST
PROGRAM IS RUNNING HERE
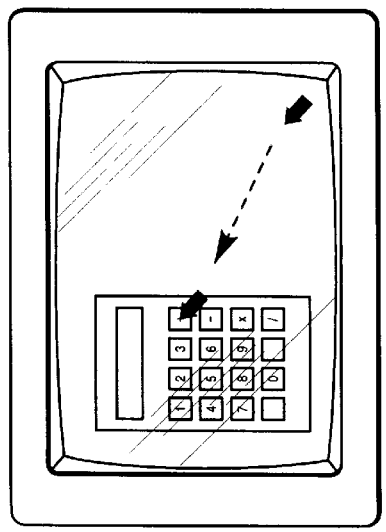
REMOTE

MODE: APPLICATION

FIG. 23

FOURSCORE AND SEVEN YEARS AGO, OUR FATHERS BOUGHT
GORTH A NEW STATION WAGON.

FIG. 24

BROUGHT
FOURSCORE AND SEVEN YEARS AGO, OUR FATHERS BOUGHT
FORTH      NATION
GORTH A NEW STATION WAGON.

FIG. 25

BROUGHT
FOURSCORE AND SEVEN YEARS AGO, OUR FATHERS BOUGHT
FORTH      NATION
GORTH A NEW STATION WAGON.

ANNOTATION OF COMPUTER VIDEO DISPLAYS

This is a Continuation of application Ser. No. 08/128,013, filed Sep. 28, 1993, now abandoned which is a Continuation-in-Part of application Ser. No. 08/035,092, filed Mar. 19, 1993.

CROSS-REFERENCE TO RELATED APPLICATIONS

This application is related to:

application Ser. No. 08/035,092, entitled "Remote Collaboration System," by Carleton et al., filed on Mar. 19, 1993, and assigned to NCR Corporation, now U.S. Pat. No. 5,649,104.

application Ser. No. 08/035,091, entitled "Remote Collaboration System," by Fitzpatrick et al., filed on Mar. 19, 1993, and assigned to NCR Corporation.

application Ser. No. 08/033,602, entitled "Remote Collaboration System," by Pommier et al., filed on Mar. 19, 1993, and assigned to NCR Corporation.

application Ser. No. 08/034,313, entitled "Remote Collaboration System," by Schwartz et al., filed on Mar. 19, 1993, and assigned to NCR Corporation, now U.S. Pat. No. 5,608,872.

application Ser. No. 08/123,012, entitled "Accelerated Replication of Multiple Computer Displays," by Hester et al., filed on the same date herewith, and assigned to NCR Corporation.

application Ser. No. 08/128,018, entitled "Direct Capture of a Video Conferencing Data," by AlonsoCedo et al., filed on the same date herewith, and assigned to NCR Corporation.

application Ser. No. 08/128,017, entitled "Method and Apparatus for Display of Video Images in a Video Conferencing System," by Carleton et al., filed on the same date herewith, and assigned to NCR Corporation.

application Ser. No. 08/128,014, entitled "Palette Management for Application Sharing in Collaborative Systems," by Hester, filed on the same date herewith, and assigned to NCR Corporation.

application Ser. No. 08/128,016, entitled "Collaborative Video Conferencing System," by Schwartz et al., filed on the same date herewith, and assigned to NCR Corporation.

REFERENCE TO A MICROFICHE APPENDIX

A microfiche appendix, containing one (1) microfiche and sixty-five (65) total frames is filed herewith.

BACKGROUND OF THE INVENTION

Modern telephone systems allow multiple parties at different locations to hold a conference. However, telephone conferences do not provide all of the conveniences of a face-to-face conference, where participants all meet at a common table in a meeting room.

For example, in a meeting room, participants can view an object of interest, such as a drawing or a product. Such viewing is not possible in a telephone conference.

The invention concerns systems for collaborative video conferencing, using the telephone system. The invention generates a common visual image which is distributed to several computers. The users of the computers can make annotations on the common image. When they do, the invention replicates the annotations on all displays of all computers.

Under the invention, the annotation does not corrupt the basic image, or document, which is annotated. Further, the invention concerns a particular type of annotation, namely, highlighting.

OBJECTS OF THE INVENTION

It is an object of the invention to provide an improved electronic conferencing system.

It is a further object of the invention to provide a system which allows users to remotely operate a computer program.

It is a further object of the invention to provide a system which allows multiple computers to operate a single program residing on one of the computers.

It is a further object of the invention to provide a system which allows multiple computer users to view and annotate a common display.

It is a further object of the invention to provide a system in which annotation of an image on a computer does not damage the data from which the image is generated.

SUMMARY OF THE INVENTION

In one form of the invention, a user can draw images or text upon a computer display, over an existing image, which may be text or a drawing. The newly drawn images are stored at a different location that is the existing image, so that the newly drawn images do not affect the file from which the existing image is generated.

BRIEF DESCRIPTION OF THE DRAWINGS

FIG. 3 illustrates how the invention responds when a host user attempts to operate the calculator, when the invention is in Annotation mode.

FIG. 4 illustrates how the invention responds when a host user attempts to annotate the calculator, when the invention is in Annotation mode.

FIG. 6 illustrates how the invention responds when a host user attempts to operate the calculator, when the invention is in Local Annotation mode.

FIG. 8 illustrates how the invention responds to a host user when in View mode.

FIGS. 15 and 15A illustrate logic flow used by the invention.

FIGS. 23–25 illustrate annotation using text and graphics as annotation tools.

DESCRIPTION OF A PREFERRED EMBODIMENT

Overview

Figure 1:
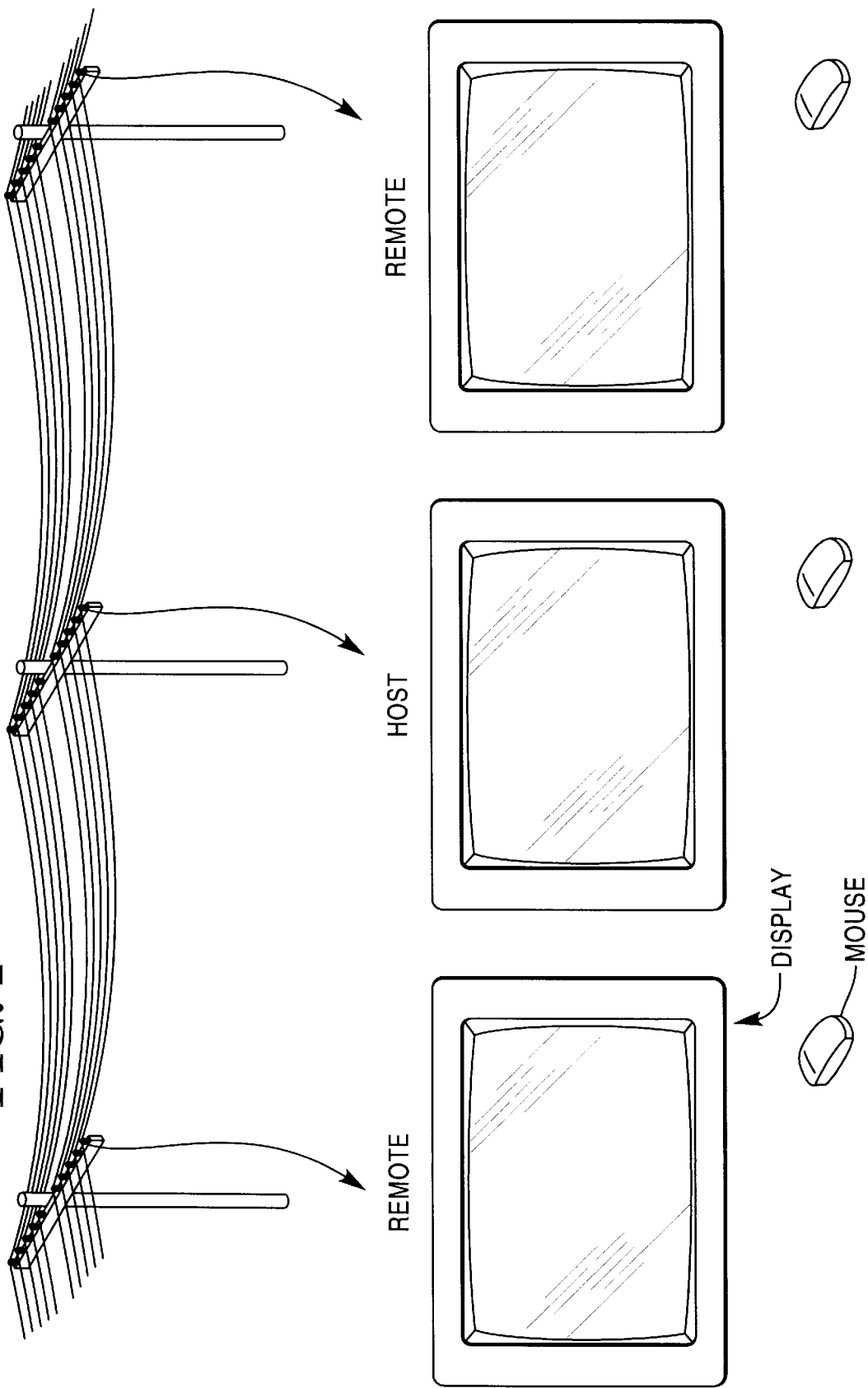
FIG. 1 illustrates three computers, connected by telephone lines.

FIG. 1 shows three computers connected by telephone links. Each computer runs a message-driven, multi-tasking, Graphical User Interface (GUI), such as that sold under the name Windows, available from Microsoft Corporation, located in Redmond, Wash. Such GUIs are also called operating environments.

The user of a GUI interacts with a program by way of windows. The invention replicates selected windows, rather than the entire display, at the remote computers. This selective replication allows users to maintain private areas on their displays, which are not shared.

Each computer also runs software developed by the inventors. In addition, one computer (the Host) runs an Application program. (It is possible for the Host to run both programs because of the multi-tasking capabilities of the GUI.)

The invention has four basic modes of operation:

1. Application Mode

Figure 2:
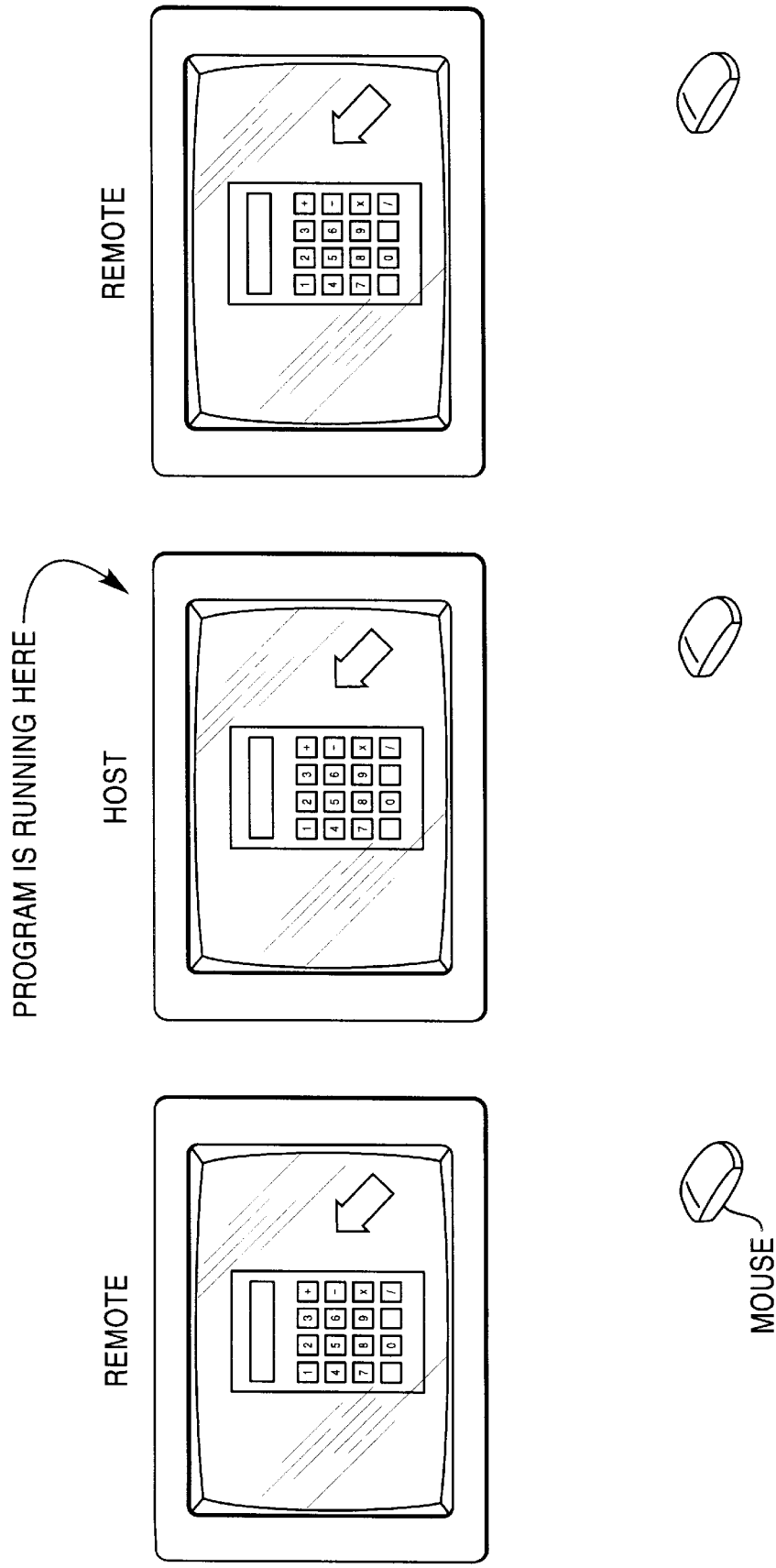
FIG. 2 initiates an example, which will be elaborated in FIGS. 3–14. In the example, a calculator program is operated, and annotated, by various parties.
Figure 5:
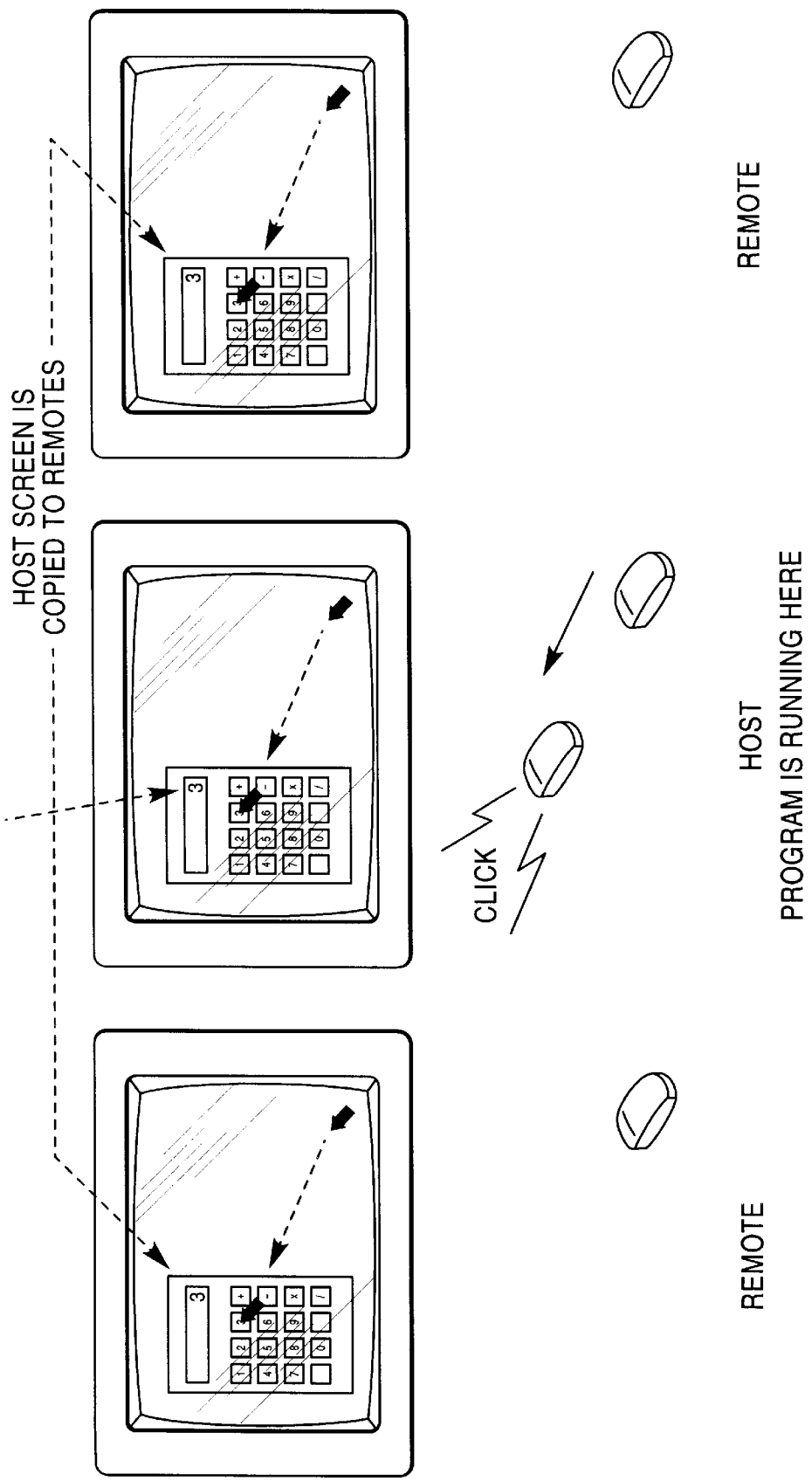
FIG. 5 illustrates how the invention responds when a host user attempts to operate the calculator, when the invention is in Application mode.

Any user of any of the three computers in FIG. 1 can issue commands to the Application program. For example, assume the Application program is one which simulates a hand-held calculator. The initial situation is shown in FIG. 2, where each computer display shows the calculator. Assume that the following events occur:

The user of the Host presses the "3" button on the calculator (either by keyboard input, or mouse input, depending upon the design of the calculator program). In response, each calculator, in its display area, shows a "3".

The user of one Remote presses "+".

The user of the other Remote presses "6".

The user of the Host presses "=".

At this point, all calculators will display "9", which is the sum of 3 and 6. The users collectively operated the calculator program, and the display of each shows the result.

The calculator program does not care which users pressed the buttons, nor whether some users pressed no buttons, provided a legal sequence of buttons was received. (It is assumed that the users are cooperative, and that no users try to sabotage operation of the calculator.)

2. Annotation Mode

Any user can draw on the user's own, local, display, using drawing tools similar to those found in a "paint" program. The user can draw boxes, circles, arcs, text, ellipses, and so on. The user can also erase items on the display.

The invention can replicate the user's annotations on all other displays, so that all users view similar displays. However, the displays could be different, because of the following factors:

(A) Different display monitors have different properties, such as resolution and color capability.

(B) Different display protocols (EGA, VGA, etc.) represent graphics images differently, and have different color capabilities.

(C) Different GUIs, or different versions of the same GUI, may have different display conventions. Different computers in FIG. 1 could run the different GUIs.

(D) Some users have changed the size of the window in which their calculator is displayed, causing a deviation in scaling.

These differences can cause differences in the appearance of the displayed images, relative to each other, but the basic content of all displays should be the same. To accommodate size differences, the invention draws to different scales as appropriate.

3. Local Annotation Mode

A user can annotate the local display, but the annotations are kept private, and no other user can see the annotations.

4. View Mode

No users can annotate, nor can they issue commands. However, an action resembling annotation can be taken. Users can move their cursors, and others will see the movement, allowing remote pointing. View Mode is useful in one embodiment, wherein, for example, Annotate Mode is in force, but a specific user's mode is designated as View. In this embodiment, all users can annotate, but the "View" user can only watch, and cannot annotate.

Explanation of Individual Modes

FIGS. 3–14 will illustrate the different modes, by way of example, using the calculator program.

FIG. 3

Host Runs Application Program

Mode is "Annotation"

User Input is at Host Computer

User Attempts to Operate Calculator

Assume that the user of the host computer attempts to add two numbers, using the calculator. Attempted entry of the first number will be considered.

The user, located at the Host, moves the Host's cursor over a key of the calculator, as shown in FIG. 3, and tries to depress the key, by clicking the mouse. However, the mouse click does not reach the Application program, because the invention blocks it. The Application program does not respond, because it receives no mouse click.

That is, in more detail, the GUI detects the mouse movement, and causes "mouse messages" to be generated. The GUI places the mouse messages into a queue, where they await processing. INPUT ROUTER in FIG. 15 reads these messages. Because "Annotation Mode" is currently in force, INPUT ROUTER directs the messages to the ANNOTATION block. APPLICATION does not receive the messages, and thus does not respond. The mouse click is ignored.

ANNOTATION's Response

ANNOTATION can be configured to respond in two (or more) ways to the mouse messages. In one configuration, ANNOTATION requires the mouse to initially select an ANNOTATION TOOL. If no selection is done, ANNOTATION ignores mouse messages.

Selection is done by clicking the mouse over an image of the tool, as is commonly done in "paint" programs. ANNOTATION recognizes this tool selection, and then treats subsequent mouse clicks as data for drawing with the selected tool. For example, if a rectangle tool were selected, the next two mouse clicks would define the diagonal corners of the rectangle. (FIG. 4, later discussed, illustrates drawing a rectangle.)

Under the second configuration, a default tool, such as a pen, is automatically selected when in Annotation Mode. In this configuration, when the user tries to depress a calculator button (by clicking on it), the user (unintentionally) initiates drawing of a line, using the pen. When the user recognizes this, the user can terminate drawing of the line, in any of several known ways.

Therefore, in Annotation Mode, the invention either (a) responds to mouse input by initiating a default annotation, or (b) ignores the mouse input, because an annotation tool was not selected. Keyboard input from the user is treated the same way. Of course, other responses by ANNOTATION can be designed.

Tracking of Cursors

Each display shows a cursor whose position is controlled by the associated mouse. The invention replicates each cursor on all displays. Thus, in FIG. 3, with three mice, there are three cursors on each display (only one is shown for simplicity).

Consequently, when one user moves a mouse, the corresponding cursor moves on all displays.

In general, the three cursors are distinguishable: each cursor identifies its owner, as by color, shape, inclusion of a label, or the like.

FIG. 4

Host Runs Application Program

Mode is "Annotation"

User Input is at Host Computer

User Attempts to Draw a Box over the Calculator

This situation is quite similar to that of FIG. 3, except that, now, the user intends to draw an annotation, instead of intending to press a button, as in FIG. 3.

Assume that the user of the host computer draws a box over the calculator. (The box is shown overly large, for emphasis. It is preferred that the box not extend beyond the calculator itself.) The invention replicates the box on the remote computers. (The box is drawn using annotation tools, which are not shown.)

Figure 15:
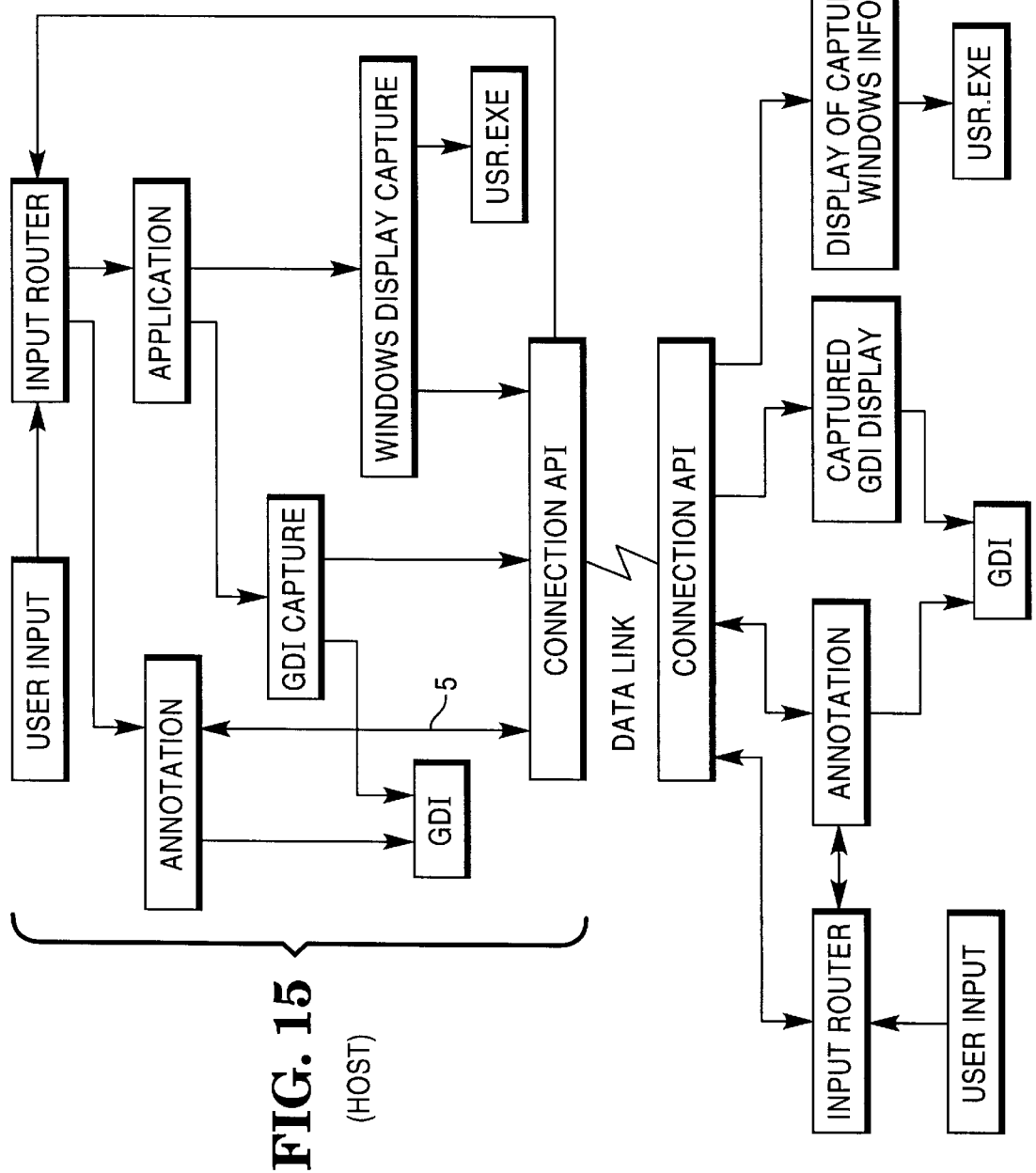

In terms of FIG. 15, INPUT ROUTER directs the logic flow to ANNOTATION. ANNOTATION calls the proper GDI functions to draw the box. Also, ANNOTATION sends "annotation messages" to CONNECTION API, which delivers the annotation messages to the Remotes.

ANNOTATION in FIG. 15A receives the annotation messages. This ANNOTATION block represents the logic executed at each remote computer. This ANNOTATION calls the proper GDI functions, via the block GDI.

"GDI" is an acronym for Graphical Device Interface. "GDI functions" are small programs, contained in a larger program of the GUI called GDI.EXE. A GDI function, when called, draws a specific graphic image, such as a circle, box, or text, based on subsequent input from the user. Other GDI functions perform other tasks, such as selecting pen widths.

GDI.EXE is a commercially available product. Technical details concerning GDI.EXE are contained in "Windows Software Development Kit," available from Microsoft Corporation, and in Programming Windows 3.1 by Charles Petzold (Microsoft Press, Redmond, Washington, 1992, ISBN 1-55615-395-3).

FIG. 5

Host Runs Application Program

Mode is "Application"

User Input is at Host Computer

User Attempts to Use Calculator

The user of the Host moves the cursor over the calculator key "3" and clicks the mouse. The GUI generates a mouse message and places in into the queue. The invention reads the mouse message, and passes the message to the Application program (i.e., the calculator program), which responds by (1) showing that the key "3" is depressed and (2) drawing the numeral "3" in the calculator's display, using GDI calls. The Application program also records the fact that the user enters a "3," for its own internal operations.

The invention also intercepts the GDI calls made by the Application program in drawing the "3" in the calculator, and in drawing the depressed "3" button. The invention notifies the other computers of the GDI calls. The other computers replicate the Host display, by executing the same GDI functions. Greater detail concerning this GDI interception is given later, in the section entitled "General Considerations."

Thus, all users simultaneously see the user of the Host operate the calculator. (The action is not exactly simultaneous, because extremely short delays are involved. However, a human probably could not detect the delays if the Host and the Remote were operating side-by-side.)

In terms of FIG. 15, the INPUT ROUTER recognizes that the mouse messages should be directed to the Application program, and directs the logic flow to APPLICATION (i.e., the calculator program). APPLICATION (1) draws a depressed "3" key and (2) writes the numeral "3" in the calculator's display, by calling appropriate GDI functions.

However, the invention, via GDI CAPTURE in FIG. 15, captures the Application program's GDI calls, before they are executed. The invention does two things with the captured calls. One, it notifies the other computers of these calls, via the block CONNECTION API. This action leads to block CAPTURED GDI DISPLAY in FIG. 15A, which causes each Remote to execute the same GDI functions, as indicated by block GDI.

Two, the invention allows the GDI functions, called by the Application program, to be executed at the host, via the block GDI in FIG. 15.

Therefore, the invention captures GDI function calls made by the Application Program. The invention notifies the Remote computers of the captured calls, so that the Remotes can duplicate them. The invention allows the captured calls to be executed as intended on the Host.

FIG. 6

Host Runs Application Program

Mode is "Local Annotation"

User Input is at Host Computer

User Attempts to Operate Calculator

Assume that in Annotation Mode, there is no default annotation tool given to the user. Under this assumption, if the user moves the cursor to a calculator button, and tries to "press" the button, the INPUT ROUTER in FIG. 15 passes the mouse message to the ANNOTATION block. Since the mouse click is not part of a valid annotation input sequence (no tool was selected), ANNOTATION draws nothing.

Further, the Remote computers do not show the movement of the cursor corresponding to the Host computer's mouse, as indicated, because line 5 in FIG. 15 does not send Annotation Messages to the other computers when Local Annotation is in force.

Further still, the calculator button is not re-drawn as a depressed button on the Host display, in response to the attempt to press it, because APPLICATION did not receive the mouse message. APPLICATION is responsible for drawing depressed calculator buttons.

If a default annotation is assigned to the user in Local Annotation Mode, the user's mouse click would initiate drawing by that tool. When the user realized the mistake, the user would terminate the drawing, in a known manner.

FIG. 7

Host Runs Application Program

Mode is "Local Annotation"

User Input is at Host Computer

User Attempts to Annotate Calculator

Under these conditions, the INPUT ROUTER in FIG. 15 recognizes a valid attempt to perform annotation, as by drawing a box. The INPUT ROUTER directs the logic flow to the ANNOTATION block, which calls the proper GDI functions for drawing the annotation, namely, a box, as shown in FIG. 7.

Figure 7:
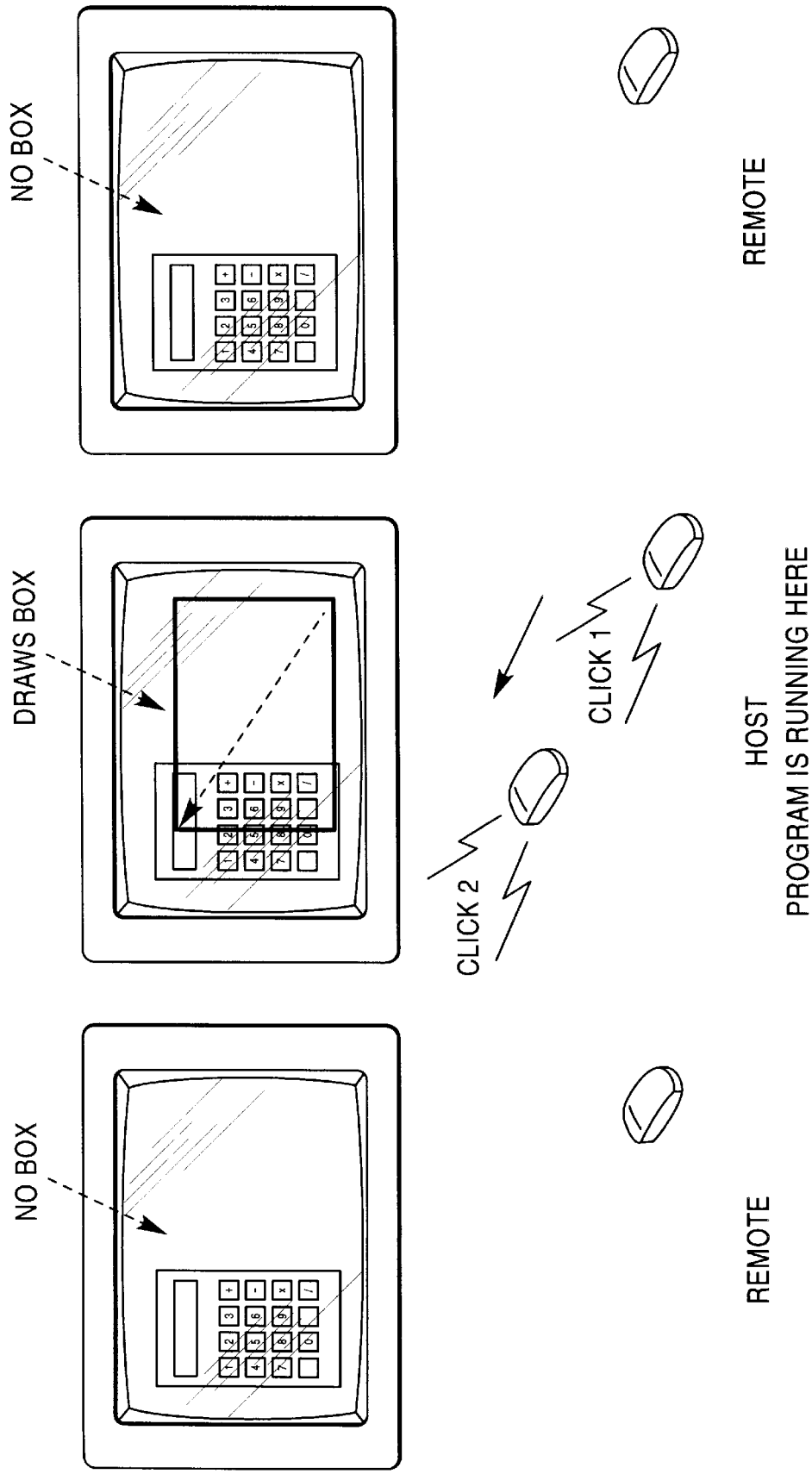
FIG. 7 illustrates how the invention responds when a host user attempts to annotate the calculator, when the invention is in Local Annotation mode.
Figure 9:
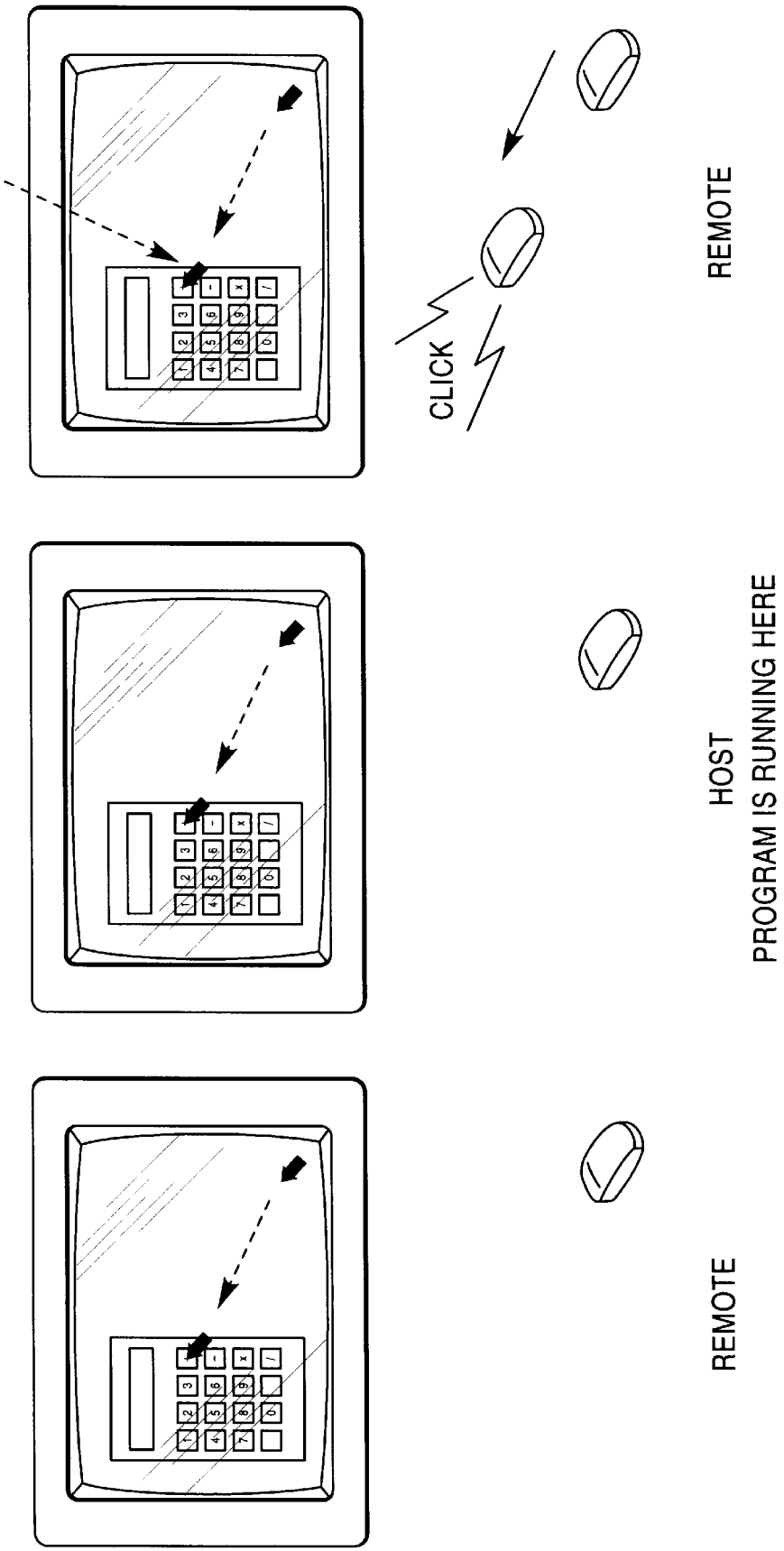
FIG. 9 illustrates how the invention responds when a remote user attempts to operate the calculator, when the invention is in Annotation mode.
Figure 10:
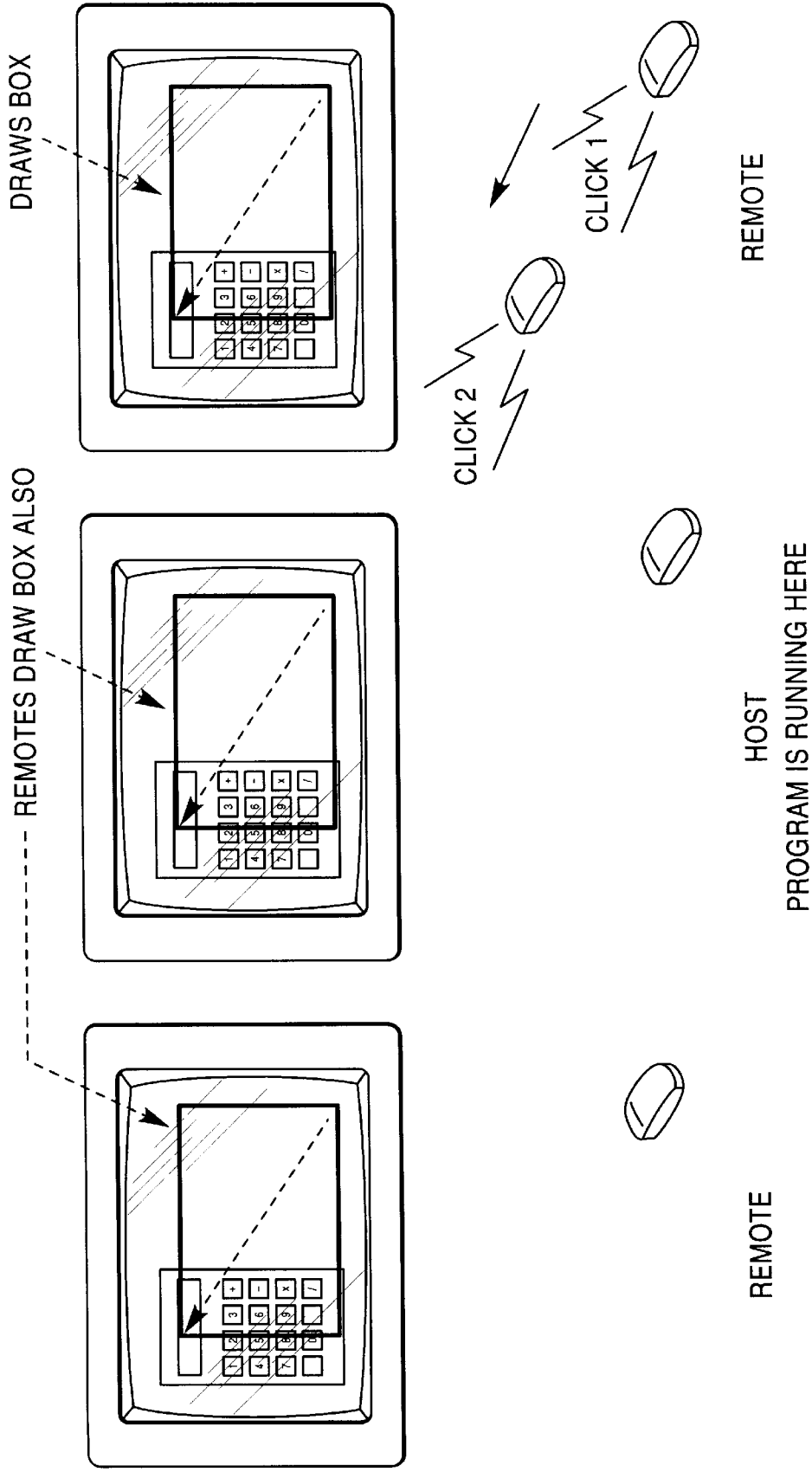
FIG. 10 illustrates how the invention responds when a remote user attempts to annotate the calculator, when the invention is in Annotation mode.
Figure 11:
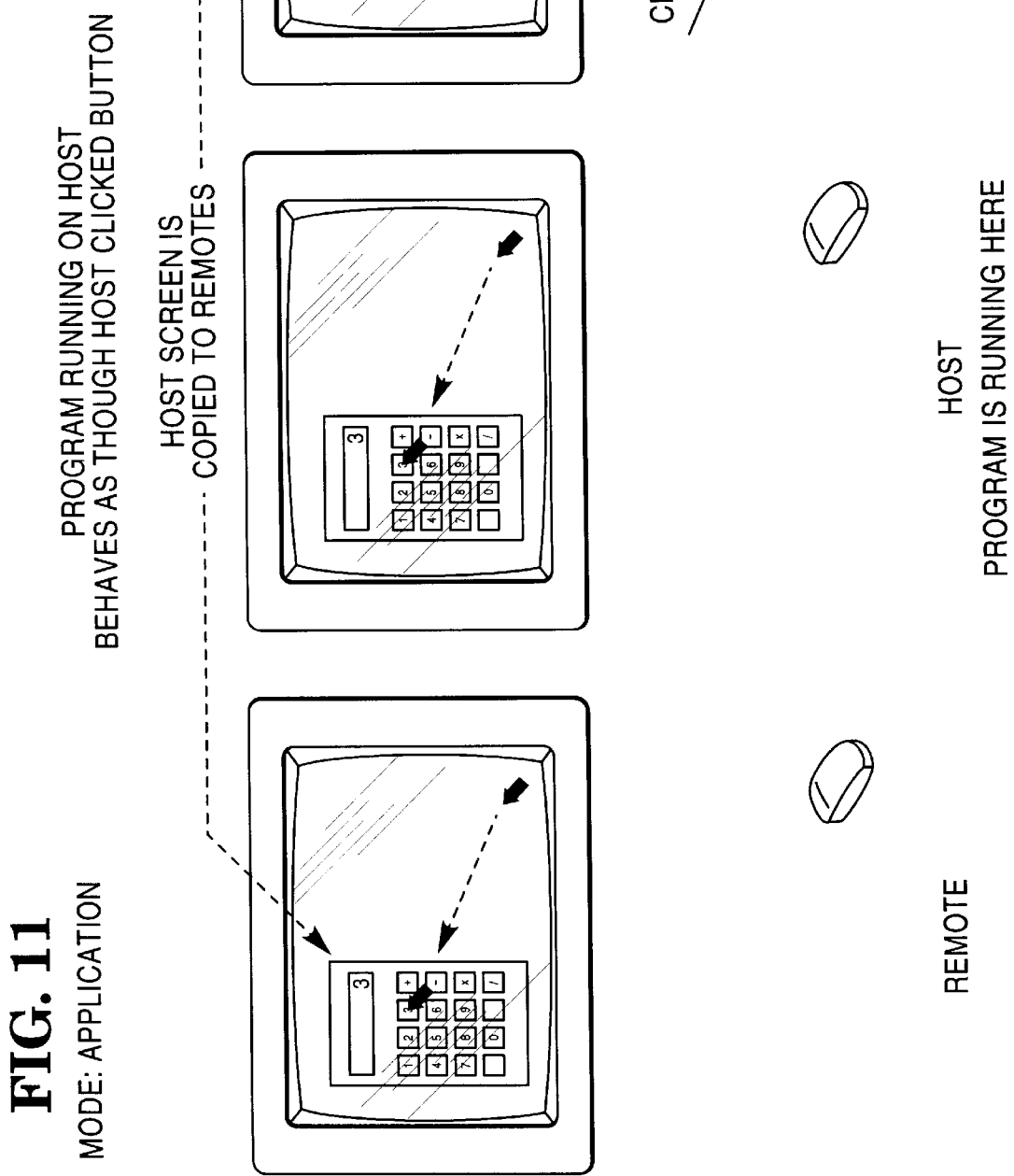
FIG. 11 illustrates how the invention responds when a remote user attempts to operate the calculator, when the invention is in Application mode.
Figure 12:
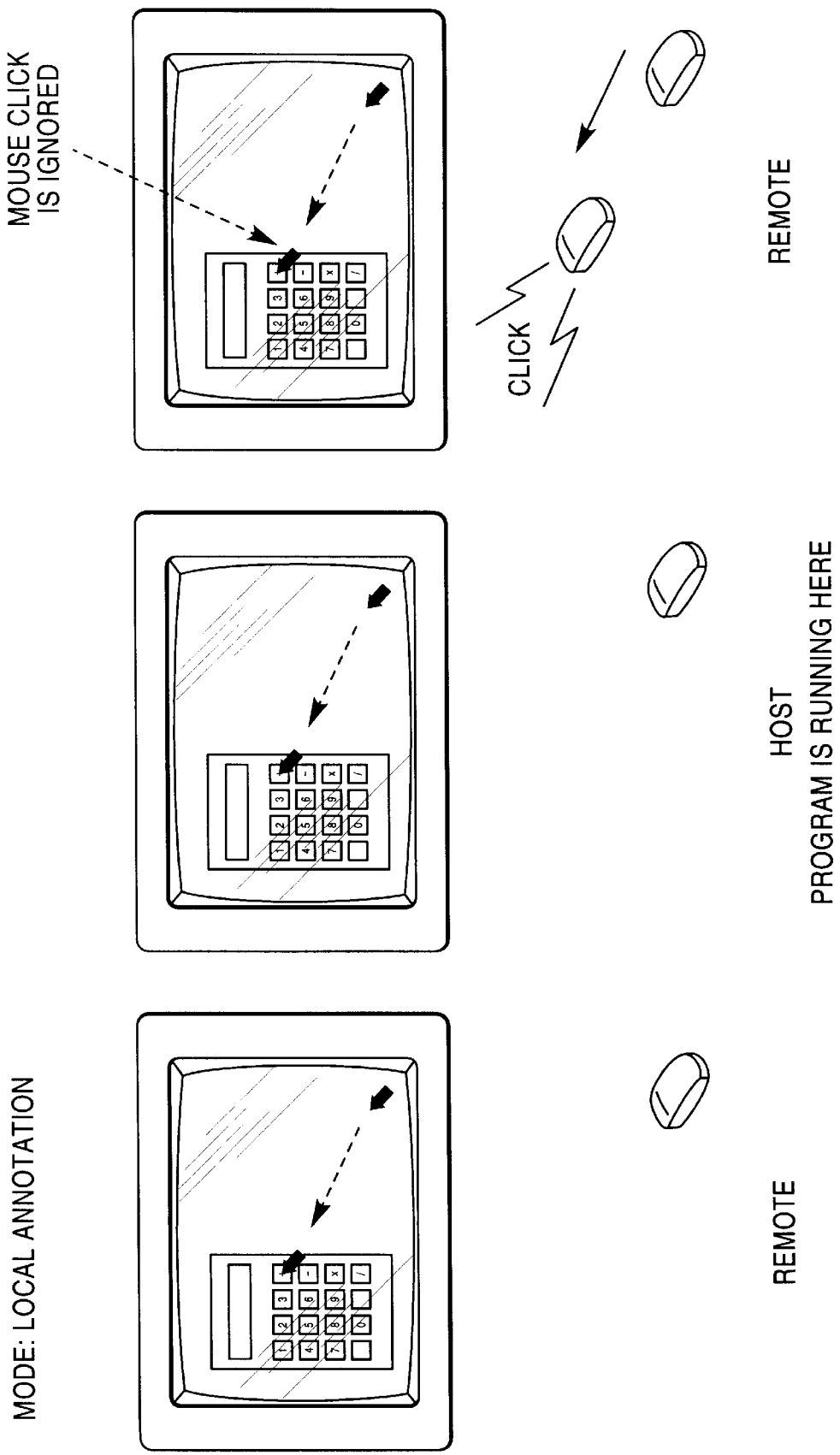
FIG. 12 illustrates how the invention responds when a remote user attempts to operate the calculator, when the invention is in Local Annotation mode.
Figure 13:
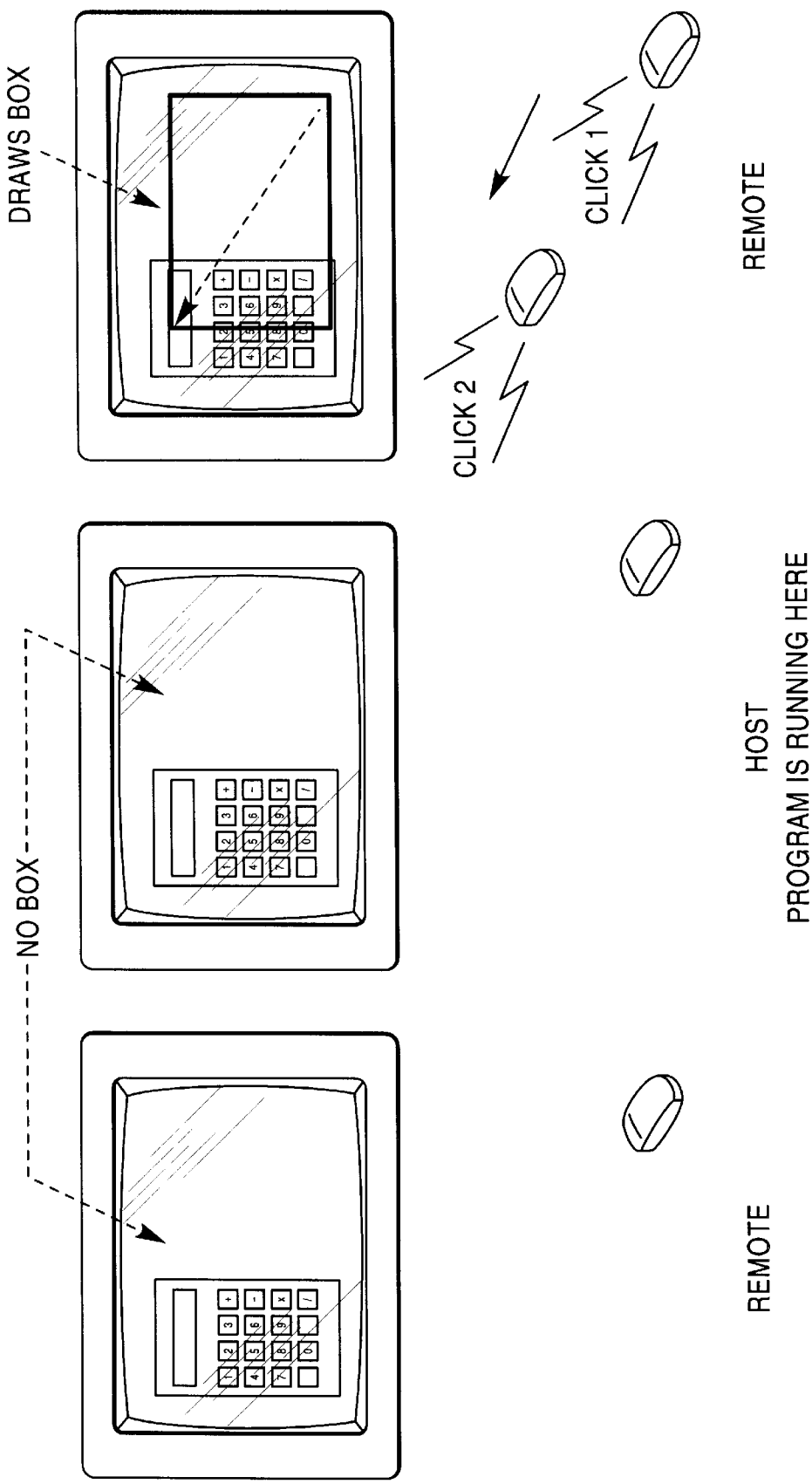
FIG. 13 illustrates how the invention responds when a remote user attempts to annotate the calculator, when the invention is in Local Annotation mode.
Figure 14:
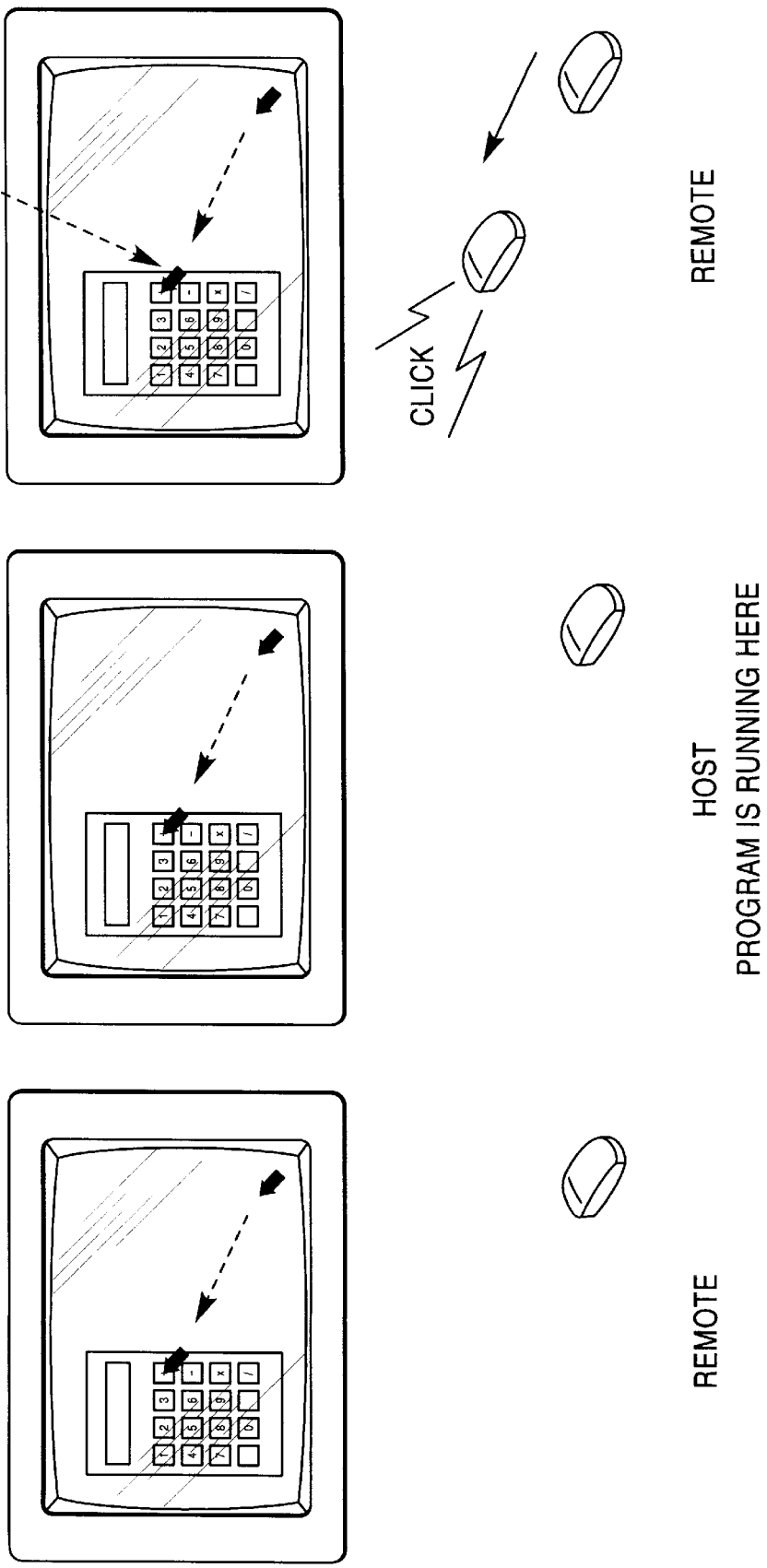
FIG. 14 illustrates how the invention responds to a remote user when in View mode.

However, because the annotation is local, no boxes are drawn on remote computers, as indicated in FIG. 7. No data is sent along data path 5 in FIG. 15.

FIG. 8

Host Runs Application Program

Mode is "View"

User Input is at Host Computer

User Attempts to Operate Calculator

As FIG. 8 indicates, the mouse click is ignored, and nothing happens at the Remotes.

In FIG. 15, the INPUT ROUTER reads the mouse message, but blocks it from APPLICATION, because the current mode is "view."

FIG. 9

Host Runs Application Program

Mode is "ANNOTATION"

User Input is at Remote Computer

User Attempts to Operate Calculator

Assume that the user moves the mouse cursor over a calculator button and clicks the mouse. The mouse click is ignored. The other computers (Host and the other Remote) show the motion of the user's cursor, but nothing else, because no tool has been selected.

In FIG. 15A, the INPUT ROUTER blocks the mouse message from reaching APPLICATION. The logic is directed to ANNOTATION, which draws a cursor on the user's Remote display, via block GDI. ANNOTATION also sends data to CONNECTION API, which directs the logic to ANNOTATION in FIG. 15. This ANNOTATION represents the annotation logic present on the two other computers: the Host and the other Remote. These ANNOTATION blocks draw cursors corresponding to the users cursor, at corresponding positions, via the GDI block in FIG. 15, which represents GDI function calls.

The Host can use one tool, such as a box-drawing tool, while a Remote can use a different tool, such as a circle-drawing tool.

FIG. 10

Host Runs Application Program

Mode is "ANNOTATION"

User Input is at Remote Computer

User Attempts to Annotate Calculator

Assume that the annotation is a box. A box is drawn on all displays. In FIG. 15A, the INPUT ROUTER at the user's Remote directs the mouse messages to the block ANNOTATION. ANNOTATION does two things. One, it calls the proper GDI functions to perform the annotation, namely, drawing the box.

Two, ANNOTATION sends annotation messages to CONNECTION API, which delivers the annotation messages to the other computers. However, one of these is the Host, and the other is a Remote. The logic at the Host reaches ANNOTATION in FIG. 15, and the logic at the other Remote reaches ANNOTATION in FIG. 15A.

Both of these ANNOTATION blocks cause the proper GDI functions to be called, to draw an annotation corresponding to the user's annotation. However, in the Host, logic path 5 is not taken at this time, because it is not necessary to replicate the Host's annotations at other computers.

FIG. 11

Host Runs Application Program

Mode is "APPLICATION"

User Input is at Remote Computer

User Attempts to Operate Calculator

The reader is reminded that the calculator program is loaded only on the host, while a Remote user wishes to operate it.

The Remote user's INPUT ROUTER in FIG. 15A routes the mouse messages to CONNECTION API. The Host receives these messages, which are delivered to the Host's INPUT ROUTER in FIG. 15. The Host's INPUT ROUTER directs the messages to the block APPLICATION (i.e., to the Application program, namely, the calculator program), which does two important things.

The calculator program treats the messages as though they were issued by the Host's mouse, even though a Remote mouse caused them. The calculator program responds in its usual way, which includes (1) showing a depressed calculator button "3", (2) writing the numeral "3" in the calculator's display, and (3) performing its own internal computations when it learns that the user entered data (namely, the "3").

However, before the calculator program can execute (1) and (2) in the previous paragraph, the Invention first captures the GDI functions which the calculator program calls. This capture is illustrated in block GDI CAPTURE in FIG. 15.

During this capture, the Invention, in effect, does two things. One, it sends these GDI functions to CONNECTION API (for the other computers to use). At the user's Remote, CONNECTION API in FIG. 15A directs the GDI functions to CAPTURED GDI DISPLAY, which replicates the Host's display. Two, it causes the GDI functions to be executed at the Host (via block GDI in FIG. 15). Therefore, the general sequence of events is the following:

The Remote user attempts to press a calculator button.

The invention running on the Remote detects this attempt, and sends data to the calculator program running on the host. The data takes the form of messages, which the calculator program "thinks" come from the Host's mouse.

The calculator program performs as usual, and draws images on the Host display, via GDI calls.

The invention captures the GDI calls, and informs the Remotes of them.

The Remotes replicate the Host's window. The Remote user thus can remotely operate the calculator program running on the Host.

Summarizing in a different way: The invention generates mouse messages at the Host, based on mouse messages at the Remote. The calculator program (running on the Host)

responds to the mouse messages as though they were generated at the Host. The invention intercepts the GDI calls made by the calculator program, and executes the same GDI calls at the Remote, thereby replicating the Host's display at the Remote.

FIG. 12

Host Runs Application Program

Mode is "Local Annotation"

User Input is at Remote Computer

User Attempts to Operate Calculator

The user's mouse click is ignored. Nothing appears on the other displays in response to the mouse movement, because of failure to select a tool.

FIG. 13

Host Runs Application Program

Mode is "Local Annotation"

User Input is at Remote Computer

User Attempts to Annotate Calculator

The annotation is drawn on the user's display, as indicated. No annotation occurs on the other displays.

FIG. 14

Host Runs Application Program

Mode is "View"

User Input is at Remote Computer

User Attempts to Operate Calculator

As indicated, the mouse cursor moves at the user's display, but the mouse click is ignored. Further, the other two displays do not show the movement of the user's mouse cursor.

General Considerations

1. Different Programs Draw Different Parts of Overall Display. The displays are drawn using GDI functions. However, different parts of a display are drawn by different programs.

Despite the fact that all these drawing operations are undertaken using GDI functions, GDI functions are not the exclusive medium of communication between computers for replicating the displays.

Annotation Involves One Type of Data

Transfer Among Computers

Drawing by an Application Program

Involves Another Type.

For example, when a user performs annotation, the user's mouse messages are replicated, AS MESSAGES, at the other computers, via path 5 in FIG. 15. These replicated messages then cause the respective ANNOTATION blocks (at the other computers) to issue the proper GDI calls for drawing the annotation. That is, GDI calls are not sent directly from the user performing the annotation to the other computers.

In contrast, when an application program causes a graphic image to be drawn on a display, the invention intercepts GDI calls (via GDI CAPTURE in FIG. 15) and causes the GDI calls to be replicated on the other computers.

Reason for Difference

A major reason for the two different procedures (replicating mouse messages and replicating GDI calls) is that annotations are stored in memory at different locations than the display information.

That is, returning to the calculator of FIG. 2, the Application program stores the image of the calculator in the following general way. Annotation data is stored by the invention; Application program data is stored by the Application program (at the host). Each image of a key is stored as data from which a GDI function can draw the key. The data includes information such as position, size, color, and so on. Each key includes an associated number. The number can be stored as a text character, with information as to position, size, font type, and so on.

Annotation data is stored at a different location, but in the same general way.

If either the annotation or the Application program needs bitmaps, the bitmaps are stored in a conventional, known manner, by the GUI.

The invention combines the annotation images with the Application's images by the known technique of masking. That is, the invention, at a Remote, plays (or executes) the received GDI functions into a bitmap. The invention plays the received annotation information into a different bitmap. The two bitmaps are masked together.

The annotation data is kept separate from the application data so that, for example, a user can save an Application image, but without annotations. Alternately, a user can save annotation data alone, or save an annotated display.

As another example, keeping the annotation data separate facilitates drawing a display having no annotation data. If the annotation data were intermingled with the calculator image data, elimination of the annotation data would be difficult, if not impossible.

If GDI calls were transmitted exclusively (i.e., no message replication were undertaken), then extra effort would be required to construct annotation data for separate storage.

2. GDI Interception, or Capture. GDI interception can be understood as follows

A. On start-up, the invention replaces the first five bytes of each GDI function with a JUMP instruction to a particular program, namely, Trap.GDI.

B. Trap.GDI gets the parameters for the desired graphics image (e.g., in the case of a box, the locations of the two diagonal corners) and calls the sub-program PkgDispCall. Trap.GDI also replaces the first five bytes.

C. PkgDispCall accepts the parameters from Trap.GDI and generates an object structure. This object structure is a block of data containing everything necessary for the other computers to draw the box.

For example, the object structure contains information as to size and position of the box. Further, the GUI draws images within a "context." The context includes things such as pen width, color, and other features. The invention tracks the contexts of the individual computers. If the context of the box drawn is different from the contexts of the remote computers, PkgDispCall includes data necessary for the other computers to create the correct contexts.

D. The object structure is shipped to the other computers, which then execute the same GDI functions.

E. The invention executes the original GDI functions.

3. Displays are not Transferred in Entirety. The displays are not replicated bit-by-bit. For example, the image of the calculator in FIG. 2 could be transferred between computers in bitwise fashion. If the calculator occupied a space of 200×300 pixels, then information regarding 60,000 (i.e., 200×300) pixels must be sent.

Instead, the particular calculator image shown in FIG. 2 is treated as eighteen rectangles, plus a text character for each of sixteen of the rectangles, giving a total of 34 objects. Each object requires parameters, such as size and position. The number of parameters is small, in the range of three to ten. Assuming ten parameters, then 340 pieces of data must be sent. Of course, the size of each piece depends on many factors, but a small number of bytes for each piece may be assumed.

Therefore, the invention reduces the 60,000 pieces of data needed for bitwise replication to 340 pieces maximum for object replication. Of course, some objects may take the form of bitmaps, and must be sent bit-by-bit. However, in general, bitmaps are expected to be rare. Further, it is expected that, in general, bitmaps, when sent, need be send only once.

Further, the object data is compressed when possible. That is, every transmission between computers is of compressed data, when possible. Compression is known in the art.

4. Types of Data Link. Communication among computers can take several forms. Commercially available networks, local and wide area, can be used. Commercially available ISDN telephone service, provided by local telephone companies, can be used. Modem communication can be used.

5. Prior Art Message Detection. There are commercially available packages which detect messages generated by the GUI in response to an input device. One such package is WINSIGHT, available from Borland International. However, it is believed that such packages do not inform remote computers of the messages.

6. Alternate GDI Capture. An alternate approach to the graphics capture described above is the following. The system-provided GDI is replaced by a separate procedure which processes GDI calls before calling the actual system GDI. The system GDI name is changed to prevent confusion between the two modules. The same technique is also used on USR.EXE to also capture GDI calls made through system-provided modules.

7. More than One Computer can Run Application Programs. A given computer can act as a Host for one program and a Remote for another. For example, one computer can run a word processing program. Another computer can run a CAD drawing program. Each is Host for its respective program.

Since the invention's software on each computer is identical, or substantially identical, all users can run either the word processing program or the CAD program, in the manner described above.

8. "Real" Cursors and "Pseudo" Cursors. There are two types of "cursor." Each GUI generates its own "real" cursor. The real cursor is not generated by GDI functions, but by an independent function in the GUI. The reader can view the cursor as a bitmap which the GUI moves in response to mouse motion.

In addition to the real cursor, which is controlled by the local mouse, the invention generates a "pseudo" cursor for each remote participant. The pseudo cursors are generated using GDI functions.

Sometimes a real cursor changes shape as the cursor moves. For example, it can take the form of an arrow when lying on a tool bar, and then change to a hand when lying on a client area. Sometimes this change is under the control of the Application program.

Therefore, if a Remote user is controlling an Application program running on a Host machine (as in FIG. 11), the Application program may change the cursor on the Host machine, but without using GDI calls. Consequently, the GDI capture of FIGS. 15 and 15A will be ineffective to replicate the changed on the Remote display.

To confront this problem, the invention watches for the functions which change the real cursor (e.g., the SetCursor command). The invention replicates the cursor change on the Remote computer.

One way is to execute the same SetCursor command. An alternate approach would be to change the Remote cursor by executing a proper sequence of GDI calls, or to draw a bitmap, when the Host cursor changes.

9. Entire Display not Replicated. The invention only replicates windows which the user of a display identifies. That is, the user can keep a workspace, such as a notepad, private during a conference. GDI calls use a task handle. If the task handle does not refer to a shared item, the GDI calls are not shared.

10. Regarding Annotation. Point number 1, in this section entitled "General Considerations," observed that the invention stores annotation data at a different location than the data for the window annotated. This different storage location has several important ramifications.

For example, when a document is annotated, the original document (and the window displaying it) remains intact, and is not corrupted by the annotation. In this connection, it is important to distinguish between a physical document, which usually takes the form of a sheet of paper, and the document under present discussion.

The latter type of document does not refer to a physical sheet of paper. Rather, this document refers to a pattern of bits stored on magnetic media, such as a tape or disc, or stored within a computer. This bit pattern, although itself intangible, can be called a document, because a tangible copy can easily be derived from it. (A computer video display or a printer produce tangible copies.)

Masking

The annotations are also bit patterns, but stored at a different location than the document. To display the annotated document, the computer combines the annotations with the document on the display by a process known as masking.

Masking is somewhat analogous to the overlaying of a transparent sheet, containing the annotations, atop the paper document. The two combined entities (transparent sheet and paper document) produce a composite image.

This overlay analogy points to a problem which the invention resolves. That is, in the analogy, if (a) the transparent sheet contains annotations which are opaque, and (b) these opaque annotations lie directly above an image on the document, the underlying image will be concealed by the opaque annotation.

Figure 16:
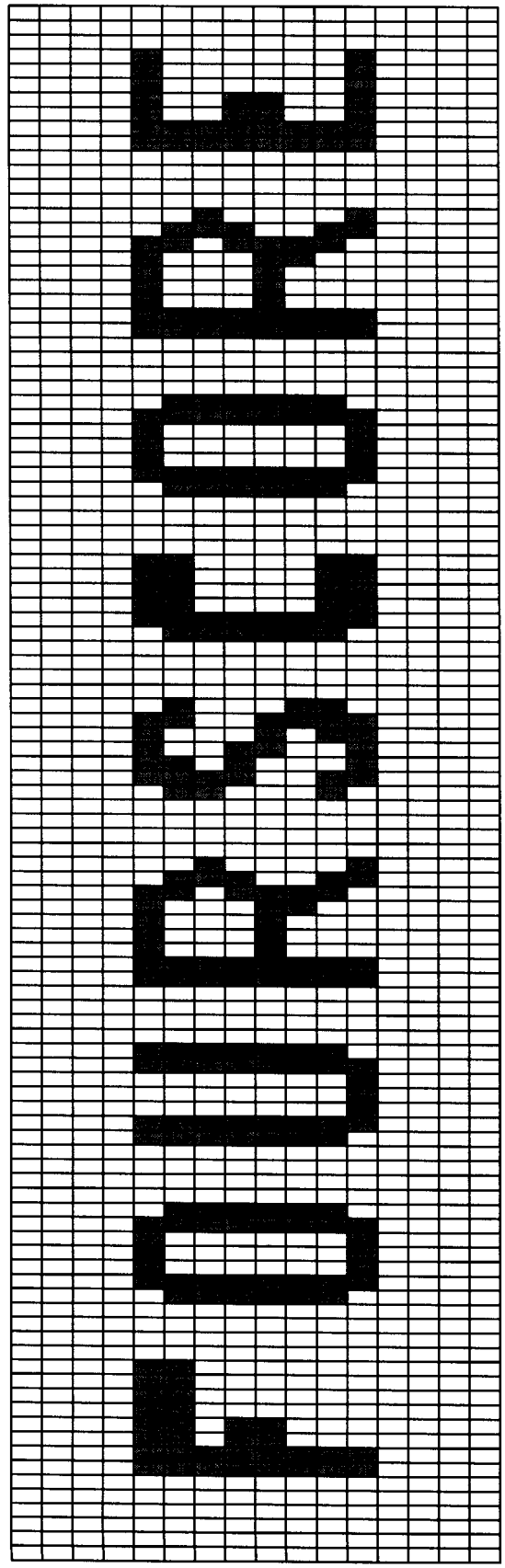
FIG. 16 illustrates how text may drawn in pixel format.

A similar type of concealment can occur in generating a computer display. The computer display is composed of pixels. For example, displays having pixel arrays of 640× 480, or even 1048×748 pixels are common. FIG. 16 illustrates the text word "FOURSCORE" as it may appear, written pixels, on a computer display.

Figure 17:
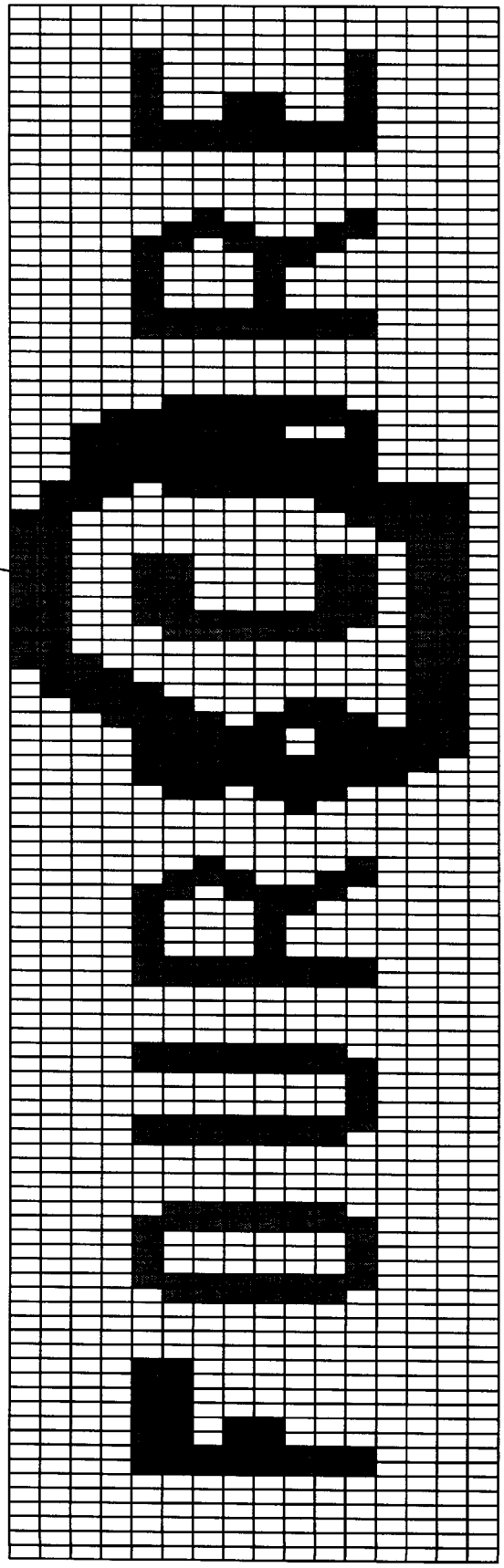
FIG. 17 illustrates how a loop, drawn in the same color as the text, may be drawn around a letter of the text of FIG. 16, but which obscures neighboring letters.

Assume that a conference participant annotates this text, by drawing a loop 100 around the letter "C", as in FIG. 17.

Methods of Annotation

The participant can draw the loop 100 in at least two ways. The participant can use a circle drawing function, which requires the participant to specify two points, such as the center and a point on the circumference. In this case, the loop is a perfect circle, and the thickness of the line composing the loop is a selected number of pixels.

FIG. 17 shows the second way. The participant selects a Highlight function in Annotation Mode. The Highlight function draws a swath trailing from the cursor. The participant sweeps the cursor in a loop, and the trailing swath forms the loop shown in FIG. 17.

The two functions treat the color of the drawn line differently. The circle drawing function draws a circle having a fixed color which is the same over the entire circumference. In contrast, the Highlight function draws in colors according to the principles which are discussed below. (Of course, these principles could be applied to drawing with the circle function, and computer code written accordingly.)

The invention offers other types of annotation tools, which are apparent from execution of the attached code, and from the listing of the code itself. For example, one annotation tool allows the annotator to type lines of text onto the document, as an annotation.

Resolution of Concealment Problem

Figure 18:
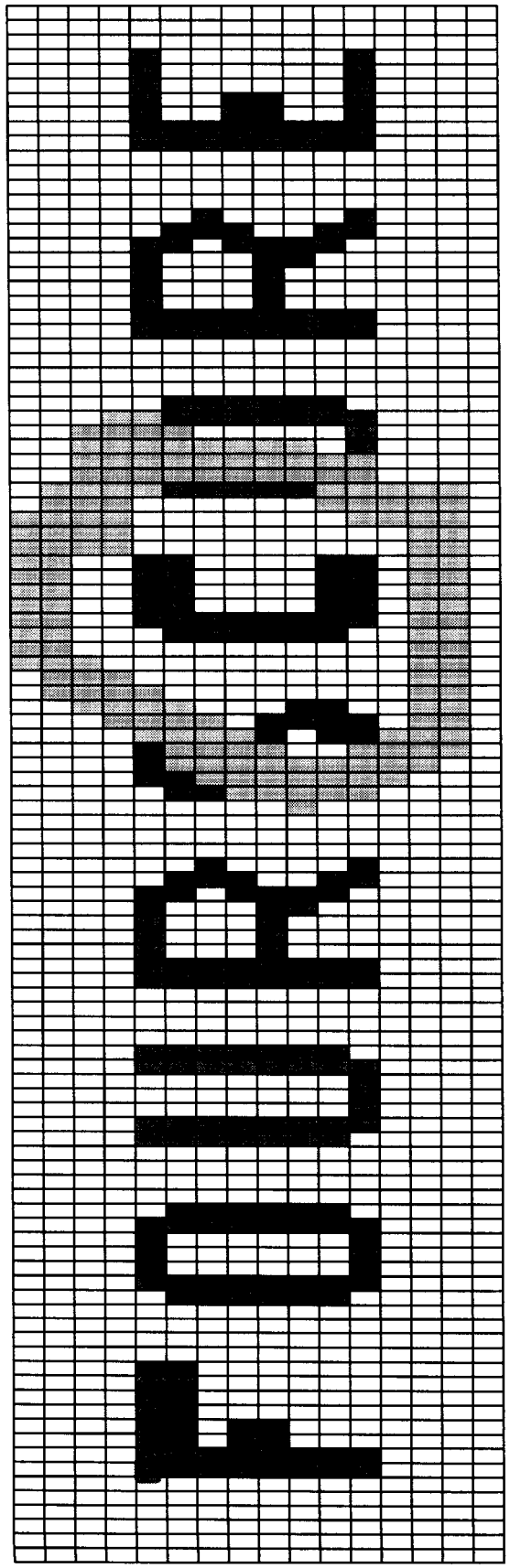
FIG. 18 illustrates how a loop, drawn in a different color than the text, still obscures neighboring letters of the text in FIG. 16.

The loop in FIG. 17 is in the same color as the text, and obscures the "S" and the "O." If the loop were drawn in a different color than the text, a similar obscuration would occur, as FIG. 18 shows.

The invention offers at least two solutions to these problems, by using a type of ANDing operation when drawing the circle. The phrase "type of ANDing operation" refers to the following general procedure, which provides the following general results. (A general description is given, because a detailed description, which identifies every possible color combination, would be hopelessly complex, because of the enormous number of possible combinations.) The invention changes color of the pixels contained in the swath swept by the cursor (when the Highlight function is selected). However, before each pixel color is changed, inquiry is made as to whether the existing pixel color is the same as the background color. If so, indicating that the pixel-about-to-be-changed is part of an image, then that pixel is changed in color, but to a color which is different from both that of the circle and the image.

Figure 19:
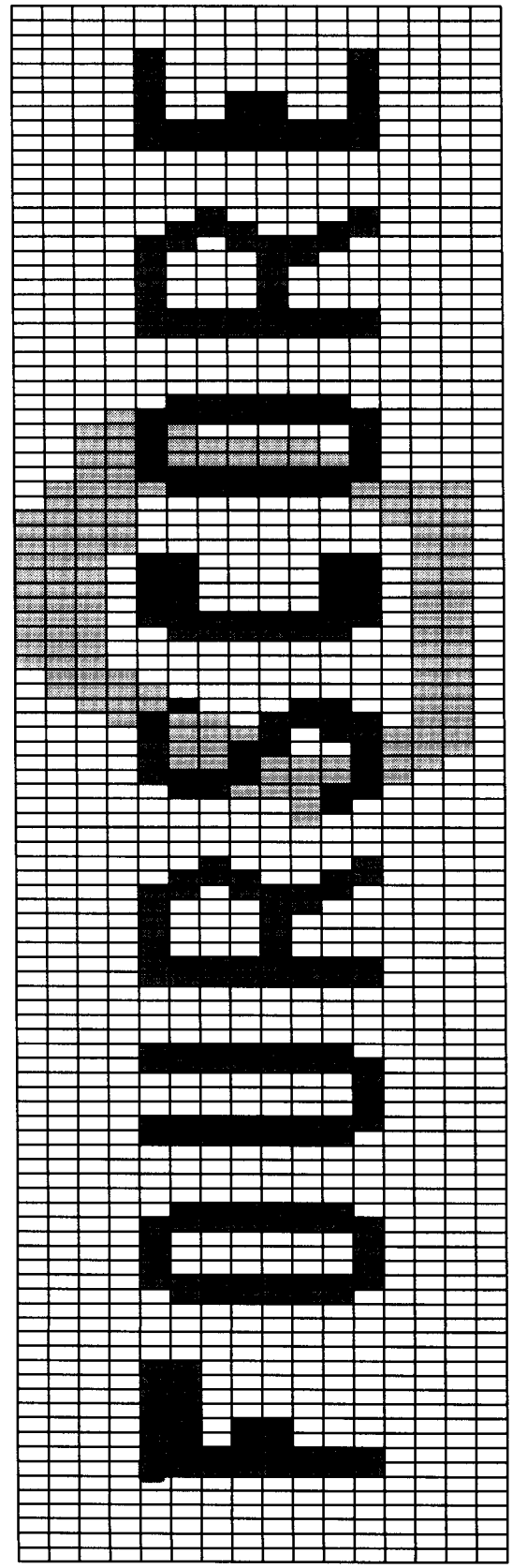
FIG. 19 illustrates ANDing the loop color with the text color, to avoid the obscuration.

That is, considering FIG. 19, the invention generates four colors:

(1) the background color,
(2) the pre-existing image color ("FOURSCORE" is the image),
(3) the color of the loop's swath crossing the pre-existing image (the loop crosses the "S" and the "O"), and
(4) the color of the loop's swath located outside the pre-existing image.

Alternate Type of Color Change

Figure 20:
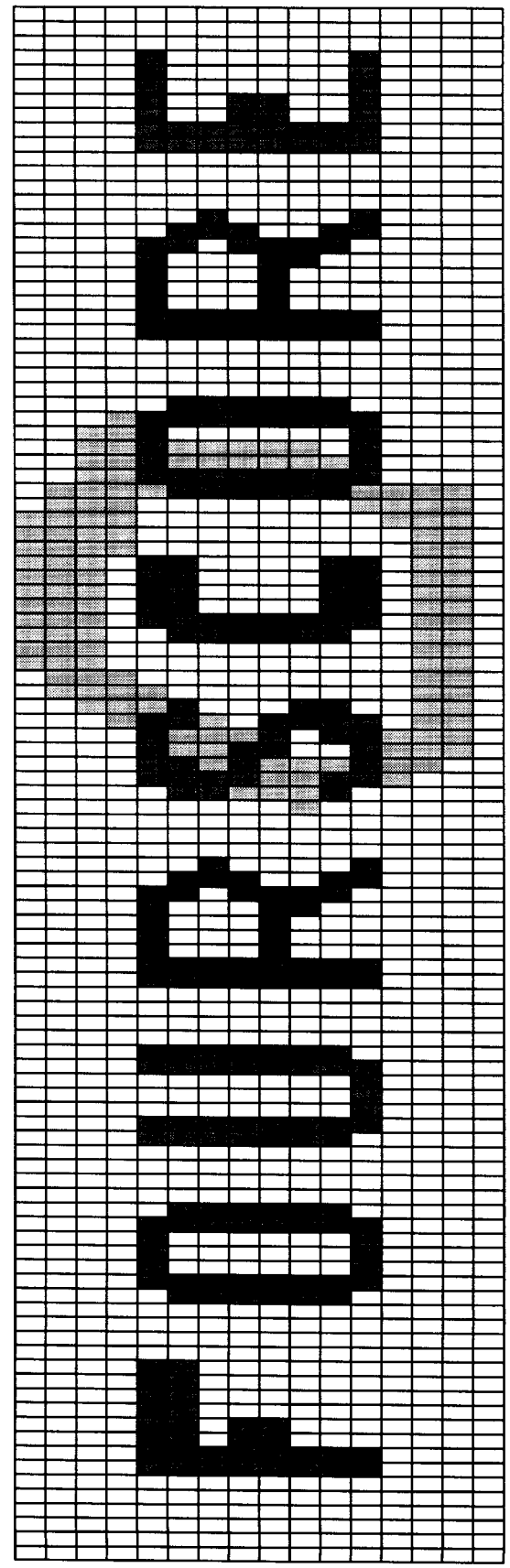
FIG. 20 illustrates another type of ANDing.

As an alternate, if the invention's inquiry indicates that the pixel-about-to-be-changed is part of an image, then the image-pixel is left intact, producing the result shown in FIG. 20.

Of course, in the alternate case, if the color of the loop is the same as the color of the pre-existing image, then the situation shown in FIG. 17 will occur. This situation can be prevented by disallowing annotation in any colors already existing on the display.

This discussion illustrates how the Highlight function deals with pixel colors, when the highlighting cursor crosses an image, in an arbitrary path. A more conventional concept of highlighting is shown in FIG. 21.

It should be recognized that this procedure is framed in terms of results. There are numerous different ways to implement software to obtain these results.

Examples of Highlighting

Figure 21:
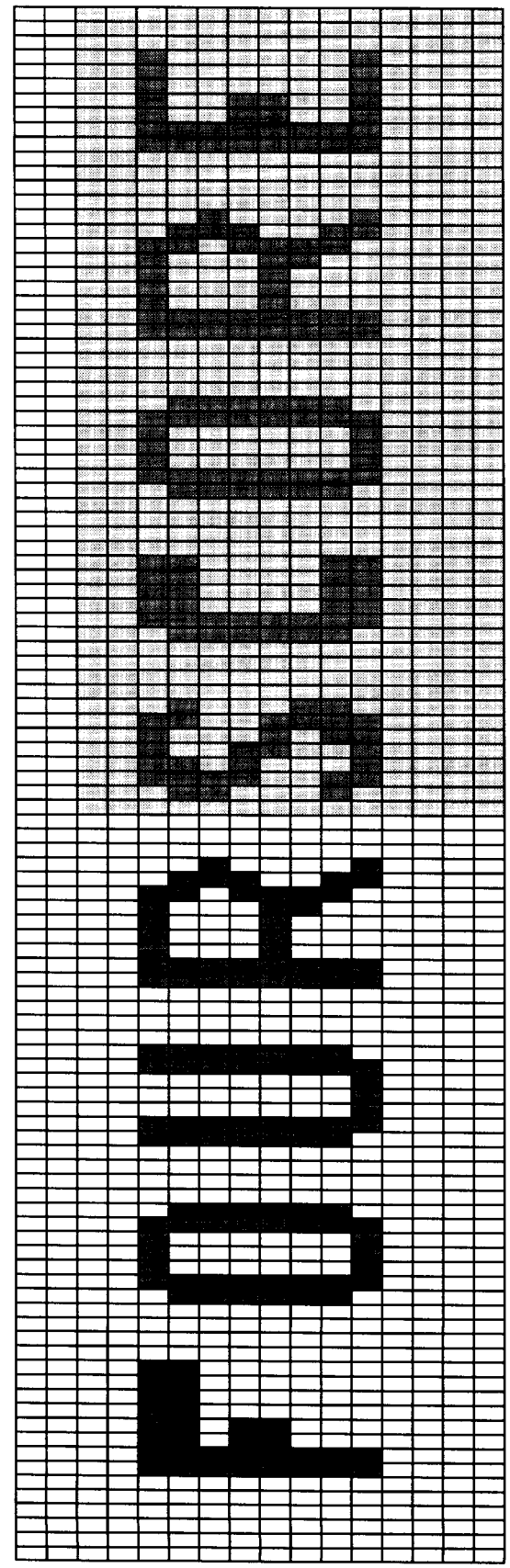
FIGS. 21 and 22 illustrate a type of highlighting.

If an annotator selects Annotation Mode, with the Highlight function, and then sweeps the cursor across the word "SCORE," then the highlighting shown in FIG. 21 is produced.

Figure 22:
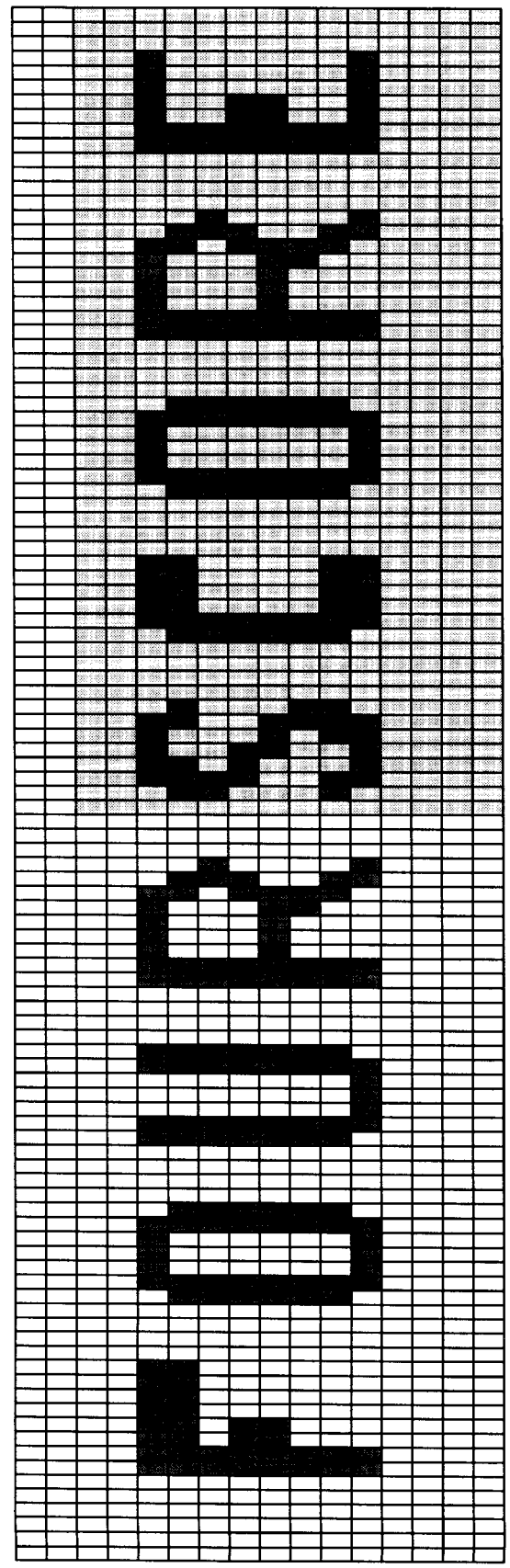

An alternate form of highlighting is shown in FIG. 22, and corresponds to the type of annotation shown in FIG. 20: the color of the pre-existing image is not changed, but only the color of the background surrounding the image.

Choice of Highlight Color

It has perhaps been implied that the annotator should use a color different from any color used by the annotated image, to prevent the obliteration shown in FIG. 17. However, sometimes, such obliteration may be positively desired, as when an image is to be crossed out.

Therefore, to accommodate annotation, both with and without obliteration, the invention provides several colors of pen, and uses different types of EX-OR type of operation. These combinations allow both (a) opaque highlighting and annotation, which obscures images on the document and (b) transparent, tinted, highlighting and annotation, which does not obscure images on the document.

Different types of EX-ORing can be undertaken with different colors of pens and brushes. For example, if a document contains black images, at least two colors of pen and brush of annotation should be made available. A black pen should be available, for obscuration, and a transparent, tinted pen should be available for highlighting.

For example, a yellow pen would suffice for highlighting, and an EX-ORing operation should be available to provide the type of highlighting shown in FIG. 20. The highlighted word "SCORE" can be made to appear grey, by the EX-OR operation, the remainder of the word is black, and the field surrounding "SCORE" is yellow.

If, in addition, a green pen is added, then, when the green pen crosses a black image, the EX-OR operation should provide another color, preferably not gray. When the green pen crosses a gray image (where the yellow pen already crossed the original image), yet another color should be selected by the EX-OR operation.

Annotation Using Text

An annotator can select the Annotation Mode, and the Text function. This combination allows the annotator to park the cursor at a selected location, and type an annotation. FIGS. 23 and 24 illustrate an example.

FIG. 23 shows the original document. FIG. 24 illustrates annotations made using the Text function. FIG. 25 illustrates annotations made using the Highlight function (or a drawing function) which cross out incorrect words. The annotated image shown in FIG. 25 is stored in a single file (that is, the annotations and the document are not stored at different locations).

An editor will later retrieve the stored, annotated image and use the invention to display it in a first window. The editor will run a word processor in a second window. The editor will view the annotated document in the first window, and make corrections on the original document in the second window. Then, the editor will save the edited original document.

Benefits

This combination of (a) annotation, (b) optional highlighting, and (c) the storage of the annotation/highlight data at a separate location than the document which is annotated provides the following benefits.

First, a window on a display can be annotated, without affecting the contents of either the window or any documents displayed in the window. This allows one to view a "trial run" of changes to the document, without actually committing to the changes. This also allows a participant to emphasize parts of a window, without permanently altering the window's contents.

Second, a participant can make annotations privately, by making them in Local Mode. No one else can see the annotations, and they do not modify the annotated document.

Third, if the annotations are made on a shared window, the annotations appear on the displays of all other conference participants. The data from which the annotations are generated is stored within each participant's computer. Thus, each participant receives a copy of the annotations. Each participant can store the annotated window, on a floppy disc, and later reconstruct the annotated window.

Fourth, a user making annotations can switch out of Annotation Mode and edit the annotated document directly. That is, the annotations can be considered as proofreader's marks. The user can view a document containing proofreader's marks, and simultaneously edit the document. Of course, the editing does not remove the annotations, because removal must be done in Annotation Mode, while editing is done in Application mode.

However, the removal of the proofreader's marks is a very simple process. A single, short, sequence of commands removes all annotations at once.

Restating the fourth benefit in a different way, a user can generate a document using a word processing program. Then the user submits the document to a remote conference session, wherein many participants see the document at their respective computers. These participants can annotate the document.

They can write free-hand notes on the document, as in a "paint" program. They can also use a text mode of annotation, where they park the cursor at a selected location on the document, and type annotations onto the document.

After annotation has terminated, the annotated document can be transferred to an editor. If the editor is a participant, no transfer is necessary. If the editor is not, the annotated document file is transferred to the editor in a known manner.

The editor incorporates the annotations into the document by calling up Application Mode, wherein the editor views a single document which bears the collective annotations of all participants. The editor makes the changes indicated by the annotations.

The editor then saves the document. Because the document and the annotations are stored at different locations, the saved document is annotation-free, yet conforming to the changes required by the annotations.

The editor can also globally delete all annotations.

Fifth, the attached computer code allows the host to grant, or refuse, permission to annotate to any selected participants.

Sixth, the attached code allows annotation to be made on any windows, including video windows. In the present context, a video window is a bit-mapped image, which is generally drawn by dedicated hardware, such as a video card. A video window is not drawn from GDI calls.

11. Computer Code. Computer code in microfiche form is attached. A description of files contained therein is contained in the following Table. A description of some files referenced in the discussion above may be located in the parent application.

TABLE

| | |
|---|---|
| annot.h | Identifiers for annotation messages |
| | Limits on the number of machines and applications that can be involved in a collaboration session |
| | Definitions of data structures containing information about shared applications |
| | Assorted prototypes for draw.cpp and sautil.cpp functions |
| appwnd.cpp | Functions to manage the window on the remote side in which the shared application is displayed |
| bitmap.cpp | Functions that do assorted bitmap manipulations |
| draw.cpp | Functions that manipulate, save, and restore the bitmaps which represent the application windows and the annotation windows |
| | Functions that impose annotations over specified windows on the screen |
| | Functions that update the annotation toolbar selections on the user's PC and on other PCs in the conference |
| | Functions that draw annotations into the annotation bitmaps |
| | Functions that package and send data to the other PCs in the conference |
| filter.cpp | Filter functions for messages. These function intercept messages in the system to determine whether they are messages that are needed by annotation functions or remote control functions. The functions also do some processing on the intercepted messages. |
| hooks.cpp | Hooks to install the filter functions in the system |
| hooks.h | Data structures needed to install the filter functions |
| inputrtr.cpp | Functions that implement the remote control functionality (simulate mouse and key events on the host that the remote created) |
| | Structures for cursors (caching of cursors, etc.) |
| | Functions to ship host's cursor across to remote if the cursor is not a standard Windows cursor) |
| | Functions to initialize input router library |
| | Functions to intercept keyboard messages |
| | Windows procedures for the input router and the shared application window |
| | Functions to handle annotation messages and user input messages that are meant for the host's shared application |
| | Functions to translate host's screen and window coordinates to those of the remote computer and vice versa |
| inputrtr.h | Data structures to support the message handling function of inputrtr.cpp |
| | Data structures to support remote control functions |
| main.cpp | User and library clean up and initialization functions |
| mousemsg.cpp | Filter functions for mouse messages (as opposed to keyboard messages) |
| sautil.c | Functions to retrieve or the index of an application in the array of shared applications that the program maintains and functions to add an application to that array (similar functionality for annotation bitmaps and masks is also in this file) |
| | Functions for changing between applications so as to indicate which application is current |
| | Functions for altering the permissions and modes of the host and remotes |
| | Functions for changing the size and position of the remote shared application windows |
| send.cpp | Functions to package and send data across the communications channel |
| status.cpp | Functions to update the messages that appear in the status bar or a window |
| telegraph.h | Assorted prototypes and data structures used to display the recreation of the image of the shared application |
| tools.cpp | Functions used to create the functionality of the annotation toolbar (drawing on the annotation bitmap, changing the property of the selected tool -- e.g. color -- changing the selected tool in the appropriate data structures, etc.) |
| trans.cpp | Functions to translate coordinates between host and remote |
| wbprdc.cpp | Functions to display the "whiteboard" |
| | Functions to allow annotation to occur on the "whiteboard" |

Numerous substitutions and modifications can be undertaken without departing from the true spirit and scope of the invention. What is desired to be secured by Letters Patent is the Invention as defined in the following claims.

We claim:

1. In a system wherein a host computer and multiple remote computers display at least one common image, the common image being generated by a program at the host computer, comprising:

a) annotation means, distinct from the program at the host computer generating the common image, for allowing users of the host computer and the multiple remote computers to make at least one annotation on the common image; and b) means for storing the annotation generated by that computer at that computer, while using the program at the host computer to store the common image at a different location at the host computer.

2. A system according to claim 1, in which the annotation means allows each user to make annotations by drawing transparent highlights onto the common image.

3. A system according to claim 1, in which the annotations means allows each user to make annotations by i) typing text onto the common image;
 ii) drawing lines onto the common image; and
 iii) drawing transparent highlights onto the common image.

4. A system wherein a host computer and multiple remote computers display at least one common image, the common image being generated by a program at the host computer, comprising:

a) means for displaying a video image in addition to the common image;
 b) annotation means, distinct from the program at the host computer generating the common image, for allowing users of the host computer and the remote computers to make at least one annotation on the common image or the video image;
 c) means for storing the annotation generated by that computer at that computer, while using the program at the host computer to store the common image at the host computer at a different location than image data and video data.

5. A system wherein a host computer and at least one remote computer display a common document, the common document being generated by the host computer, comprising:

a) means for allowing users of the host computer and the remote computers to make at least one annotation on the document;
 b) means for storing the annotated document;
 c) means for retrieving the annotated document from storage and displaying it;
 d) means for allowing a user to
  i) edit the annotated document and
  ii) remove all annotations using a single sequence of commands.

6. A computer system comprising.

(a) means for permitting two or more users of respective computers to produce a common document, the common document additionally including annotations to the common document, the annotations including typed annotations to the common document generated by machine, and
 (b) means for permitting one of the users to obtain the common document, with annotations absent, the means for obtaining the common document being such as not to require user removal of annotations individually.

7. A system according to claim 6, in which the annotations include typed characters generated by machine.

8. A system according to claim 1, in which the annotations means allows each user to make annotations by typing text onto the common image.

9. A system according to claim 1, in which the annotation means allows each user to make annotations by i) typing text onto the common image; and
 ii) drawing lines onto the common image.

10. A system according to claim 1, in which the annotation means allows each user to make annotations by i) typing text onto the common image; and
 ii) drawing transparent highlights onto the common image.

11. A system according to claim 1, in which the annotation means allows each user to make annotations by i) typing text onto the common image;
 ii) drawing lines onto the common image; and
 iii) drawing transparent highlights onto the common image.

12. A system according to claim 5, including annotation means allowing each user to make annotations by typing text onto the common document.

13. A system according to claim 5, including annotation means allowing each user to make annotations by i) typing text onto the common document; and
 ii) drawing lines onto the common document.

14. A system according to claim 5, including annotation means allowing each user to make annotations by i) typing text onto the common document; and
 ii) drawing transparent highlights onto the common document.

15. A system according to claim 5, including annotation means allowing each user to make annotations by i) typing text onto the common document;
 ii) drawing lines onto the common document; and
 iii) drawing transparent highlights onto the common document.

16. A system according to claim 6, including annotation means allowing each user to make annotations by typing text onto the common document.

17. A system according to claim 6, including annotation means allowing each user to make annotations by i) typing text onto the common document; and
 ii) drawing lines onto the common document.

18. A system according to claim 6, including annotation means allowing each user to make annotations by i) typing text onto the common document; and
 ii) drawing transparent highlights onto the common document.

19. A system according to claim 6, including annotation means allowing each user to make annotations by i) typing text onto the common document;
 ii) drawing lines onto the common document; and
 iii) drawing transparent highlights onto the common document.

20. A computer system including multiple computers, each of which is running a message-driven operating system comprising a) a shared program on a single host computer generating a common image;
 b) annotation means for allowing users of the computers to make at least one annotation on the common image; and
 c) means for storing annotation data generated by that computer at that computer, while using the shared program to store the common image at a different location;
 d) in which one or more of the means of b) or c) is a computer program which is distinct from the shared program.

21. A computer system including multiple computers, each of which is running a message-driven operating system comprising a) a shared program on a single host computer generating a common image;
 b) means for displaying a video image in addition to the common image;

c) annotation means for allowing users of the computers to make at least one annotation on the common image or on the video image;
d) means for storing the annotation generated by that computer at that computer, while using the shared program to store the common image at a different location than the video image;
e) in which one or more of the means of b), c), or d) is a computer program which is distinct from the shared program.

22. A computer system including multiple computers, each of which is running a message-driven operating system comprising:
   a) a shared program on a single host computer used to generate a document;
   b) means for allowing users of the computers to make at least one annotation on the document;
   c) means for storing the annotated document;
   d) means for retrieving the annotated document from storage and displaying it;
   e) means for allowing a user to
      i) edit the annotated document and
      ii) remove all annotations using a single sequence of commands;
   f) in which one or more of the means of b), c), d), or e) is a computer program which is distinct from the shared program.

23. A computer system including multiple computers, each of which is running a message-driven operating system comprising:
   a) a shared program on a single host computer used to generated a common document;
   b) means for permitting two or more users of respective computers to use the shared program to produce the common document, the common document additionally including annotations to the common document, the annotations including typed annotations to the common document generated by machine,
   c) means for permitting one of the users to obtain the common document, with annotations absent, the means for obtaining the common document being such as not to require user removal of annotations individually, and
   d) in which one or more of the means of b) or c) is a computer program which is distinct from the shared program.

24. A system according to claim 20, in which the annotation means allows each user to make annotations by
   i) typing text onto the common image;
   ii) drawing lines onto the common image; and
   iii) drawing transparent highlights onto the common image.

25. A system according to claim 21, including annotation means allowing each user to make annotations by
   i) typing text onto the common document;
   ii) drawing lines onto the common document; and
   iii) drawing transparent highlights onto the common document.

26. A system according to claim 22, including annotation means allowing each user to make annotations by
   i) typing text onto the common document;
   ii) drawing lines onto the common document; and
   iii) drawing transparent highlights onto the common document.

27. A system according to claim 23, including annotation means allowing each user to make annotations by
   i) typing text onto the common document;
   ii) drawing lines onto the common document; and
   iii) drawing transparent highlights onto the common document.

* * * * *